(12) United States Patent
Narita

(10) Patent No.: US 11,128,150 B2
(45) Date of Patent: *Sep. 21, 2021

(54) CHARGE CONTROLLING SYSTEM

(71) Applicant: Azbil Corporation, Tokyo (JP)

(72) Inventor: Hiroaki Narita, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 405 days.

This patent is subject to a terminal disclaimer.

(21) Appl. No.: 16/052,785

(22) Filed: Aug. 2, 2018

(65) Prior Publication Data

US 2019/0044346 A1 Feb. 7, 2019

(30) Foreign Application Priority Data

Aug. 4, 2017 (JP) ................ 2017-151409

(51) Int. Cl.
*H02J 7/00* (2006.01)
*F16K 31/04* (2006.01)
*H02J 7/34* (2006.01)

(52) U.S. Cl.
CPC ............ *H02J 7/0013* (2013.01); *F16K 31/04* (2013.01); *H02J 7/345* (2013.01); *H02J 7/0022* (2013.01)

(58) Field of Classification Search
CPC ........ H02J 7/0013; H02J 7/345; H02J 7/0036; H02J 7/007; F16K 31/04; G03F 7/70758; G03F 7/70775; F01L 1/00; F01L 1/02; F01L 1/12; F01L 1/20; F01L 2009/0401; F01L 2009/0419; F01L 2009/0423; F01L 9/04

USPC .............................................. 307/52, 53, 82
See application file for complete search history.

(56) References Cited

U.S. PATENT DOCUMENTS

| | | | |
|---|---|---|---|
| 9,000,733 B2 * | 4/2015 | Narita | F16K 37/0083 320/166 |
| 9,762,069 B2 | 9/2017 | Bourilkov et al. | |
| 2011/0208363 A1 * | 8/2011 | Vanderlaan | E02F 9/207 700/282 |

(Continued)

FOREIGN PATENT DOCUMENTS

| JP | 2012-235581 A | 11/2012 |
|---|---|---|
| JP | 2013-096551 A | 5/2013 |

(Continued)

OTHER PUBLICATIONS

Korean Patent Office, "Office Action", issued in Korean Patent Application No. 10-2018-0090318, which is a KR counterpart of U.S. Appl. No. 16/052,785, dated Jun. 19, 2020, 15 pages (7 pages of English Translation of Office Action and 8 pages of Office Action).

(Continued)

*Primary Examiner* — Michael R. Fin

(57) ABSTRACT

When interruption of electric service occurs, each of a number of electric actuators forcibly drives a motor using electric energy stored in an electricity storing portion and returns a valve to a predetermined opening position. When receiving a charge start command from a host device, each of the electric actuators starts the charging of the electricity storing portion. The host device divides the electric actuators into groups according to predetermined priority of charging and transmits charge start commands to the electric actuators for each of the groups in order of the priority.

10 Claims, 21 Drawing Sheets

(56) References Cited

U.S. PATENT DOCUMENTS

| | | |
|---|---|---|
| 2013/0113441 A1 | 5/2013 | Narita |
| 2014/0253034 A1 | 9/2014 | Kurimoto et al. |
| 2020/0182506 A1* | 6/2020 | Matthey .................. F24F 11/46 |

FOREIGN PATENT DOCUMENTS

| | | |
|---|---|---|
| JP | 2014-176232 A | 9/2014 |
| JP | 5793400 B2 | 10/2015 |
| JP | 2016-015881 A | 1/2016 |
| KR | 20160023019 A | 3/2016 |

OTHER PUBLICATIONS

Japan Patent Office, "Notice of Reasons for Refusal", issued in Japanese Patent Application No. 2017-151409, which is a Japanese counterpart of U.S. Appl. No. 16/052,785, dated Mar. 2, 2021, 10 pages (5 pages of English translation of Office Action and 5 pages of Office Action).

\* cited by examiner

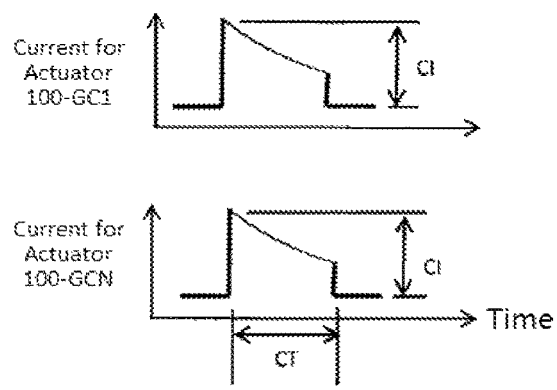
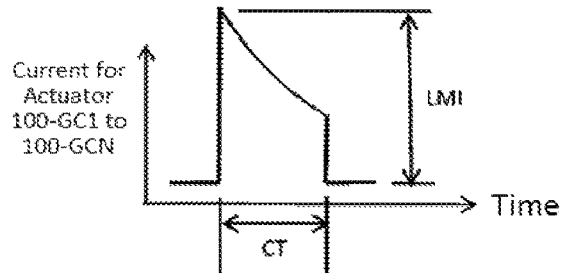
Fig. 9(A)　　　　　　　　　　Fig. 9(B)
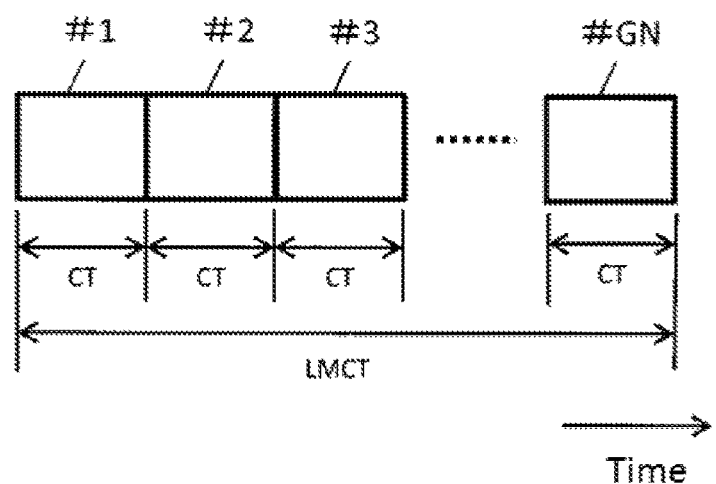
Fig. 10

CHARGE CONTROLLING SYSTEM

CROSS-REFERENCE TO RELATED APPLICATION

The present application claims the benefit of and priority to Japanese Patent Application No. 2017-151409, filed on Aug. 4, 2017, the entire contents of which are incorporated by reference herein.

TECHNICAL FIELD

The present invention relates to an electric actuator that returns a valve to a predetermined opening position by forcibly driving a motor during interruption of electric service using electric energy stored in an electricity storing portion, more particularly to a charge controlling system that controls the charging of electricity storing portions of a plurality of electric actuators.

BACKGROUND

At present, there is a spring return actuator that uses a spring to forcibly operate a valve to a fully closing direction when interruption of electric service occurs. A spring return actuator has problems in that (I) power consumption is large because a motor for generating a large torque is necessary to obtain the load torque for driving a valve and the torque for winding a spring, (II) the target position during interruption of electric service can be set to only a fully closed position and cannot be set to a fully open position or another position, and (III) mechanisms, such as a clutch and a brake, for controlling operation during interruption of electric service are necessary.

As means for solving these problems, there is proposed an electric actuator that returns the valve to a predetermined opening position by forcibly driving a motor during interruption of electric service using electric energy stored in an electricity storing portion, such as an electric double layer capacitor (see PTL 1).

Such an electric actuator eliminates the need to wind a spring using the rotating force of a motor. However, when a plurality of electric actuators 300-1 to 300-N are connected to one power supply system 301, as illustrated in FIG. 24, if an attempt is made to charge the electricity storing portions of the electric actuators 300-1 to 300-N all together when the electric power is turned on to reduce charge time, a problem occurs in that a relatively large charge current flows through the electric actuators 300-1 to 300-N, as illustrated in FIG. 25, so a power switchboard 302 needs to have a breaker with a large current capacity.

In addition, if an attempt is made to charge the electricity storing portions of the electric actuators 300-1 to 300-N in sequence after the electric power is turned on, because the charge time is relatively long, a problem occurs in that the charge time until all of the electricity storing portions of the electric actuators 300-1 to 300-N have been charged becomes long as is clear from FIG. 26.

CITATION LIST

Patent Literature

[PTL 1] Japanese Patent No. 5793400

SUMMARY

The invention addresses the above problems with an object of optimizing the current capacity required for a power supply system and the total charge time of a plurality of electric actuators when the electric actuators are connected to one power supply.

A charge controlling system according to the invention comprises a plurality of electric actuators that are connected to a single power supply system; and a host device that controls charging of the plurality of electric actuators, in which each of the actuators comprises an opening degree controlling portion that controls an opening degree of a valve according to an opening degree target value when the actuator is energized by receiving electric power from the power supply system, an electricity storing portion that stores electric energy, a charging portion that charges the electricity storing portion when the actuator is energized, a return controlling portion that operates the valve to a predetermined opening position using the energy stored in the electricity storing portion when the electric power is shut off and interruption of electric service occurs, and a charge controlling portion that causes the charging portion to start charging of the electricity storing portion when receiving a charge start command from the host device, and in which the host device comprises a sorting portion that divides the plurality of electric actuators into groups according to a predetermined priority of charging, and a charge start command transmitting portion that transmits the charge start commands to the electric actuators for each of the groups in order of the priority.

In addition, in one example of the structure of the charge controlling system according to the invention, the charge start command transmitting portion of the host device transmits the charge start commands to the electric actuators in one of the groups that has a second (or next) highest priority when a predetermined charge time elapses after transmitting the charge start commands.

In addition, in one example of the structure of the charge controlling system according to the invention, each of the electric actuators further comprises a charge completion response transmitting portion that transmits a charge completion response to the host device when the electricity storing portion has been charged, the host device further comprises a charge completion response receiving portion that receives the charge completion response from the electric actuator, and the charge start command transmitting portion of the host device transmits the charge start commands to the electric actuators in one of the groups that has a second (or next) highest priority after receiving the charge completion responses from all of the electric actuators to which the charge start commands have been transmitted.

In addition, in one example of the structure of the charge controlling system according to the invention, the sorting portion divides the plurality of electric actuators into groups so that the total current flowing from the power supply system to the electric actuators being charged is equal to or less than a maximum allowable current capacity value and an electric actuator having a higher priority is charged earlier.

In addition, in one example of the structure of the charge controlling system according to the invention, the sorting portion divides the plurality of electric actuators into groups so that the total time required to charge the plurality of electric actuators is equal to or less than a maximum allowable charge time and an electric actuator having a higher priority is charged earlier.

In addition, a charge controlling system according to the invention comprises a plurality of electric actuators that are connected to a single power supply system; and a host device that controls charging of the plurality of electric actuators, in which each of the actuators comprises an opening degree controlling portion that controls an opening degree of a valve according to an opening degree target value when the actuator is energized by receiving electric power from the power supply system, an electricity storing portion that stores electric energy, a charging portion that charges the electricity storing portion when the actuator is energized, a return controlling portion that operates the valve to a predetermined opening position using the energy stored in the electricity storing portion when the electric power is shut off and interruption of electric service occurs, a charge controlling portion that causes the charging portion to start charging of the electricity storing portion when receiving a charge start command from the host device, and a charge completion response transmitting portion that transmits a charge completion response to the host device when the electricity storing portion has been charged, and in which the host device comprises a charge unit count calculating portion that calculates a maximum number of the electric actuators to be charged at a time based on a maximum allowable current capacity value or a maximum allowable charge time, and a charge start command transmitting portion that transmits the charge start commands to the maximum number of the electric actuators in order of a predetermined priority of charging, the charge start command transmitting portion transmitting the charge start commands to as many electric actuators as the electric actuators that have transmitted the charge completion responses in order of the priority among the electric actuators that have not been charged when receiving the charge completion responses.

In addition, in one example of the structure of the charge controlling system according to the invention, the charge unit count calculating portion calculates the maximum number so that the total current flowing from the power supply system to the electric actuators being charged is equal to or less than the maximum current capacity value.

In addition, in one example of the structure of the charge controlling system according to the invention, the charge unit count calculating portion calculates the maximum number so that the total time required to charge the plurality of electric actuators is equal to or less than the maximum charge time.

Since the host device divides the plurality of electric actuators connected to a single power supply system into groups, transmits charge start commands for each of the groups, and charges the electricity storing portions of the electric actuators for each of the groups in the invention, the current capacity required for the power supply system and the power switchboard and the total charge time for the electric actuators can be optimized. In addition, in the invention, the electricity storing portions of the electric actuators can be charged in order of priority by dividing the electric actuators into groups according to the priority of charging of the electric actuators.

In addition, in the invention, the electric actuator itself decides whether the electricity storing portion has been charged and, when deciding that the electricity storing portion has been charged, the electric actuator transmits a charge completion response to the host device. When receiving the charge completion responses from all of the electric actuators to which the charge start commands have been transmitted, the host device transmits the charge start commands to the electric actuators in the next group. This can reduce the total charge time of the electric actuators in the invention.

In addition, since the invention transmits the charge start command to each of the electric actuators individually while controlling the number of electric actuators to be charged at a time to the maximum number or less, the current capacity required for the power supply system and the power switchboard and the total charge time for the electric actuators can be optimized. In addition, since the embodiment transmits the charge start command according to the priority of charging of the electric actuators, the electricity storing portions of the electric actuators can be charged according to the priority. In addition, since the host device transmits the charge start commands to the electric actuators when receiving the charge completion responses from all of the electric actuators to which the charge start commands have been transmitted, the charge time can be further reduced.

BRIEF DESCRIPTION OF THE DRAWINGS

FIG. 6 is a flowchart illustrating the operation of the electric actuator according to the first embodiment of the invention when the electric power is turned on.

FIGS. 9A and 9B are graphs used to describe a charging method that uses an RC series circuit.

FIG. 10 is a drawing used to describe the maximum charge time when electricity storing portions of the electric actuators are charged for each group.

DETAILED DESCRIPTION

First Embodiment

Figure 1:
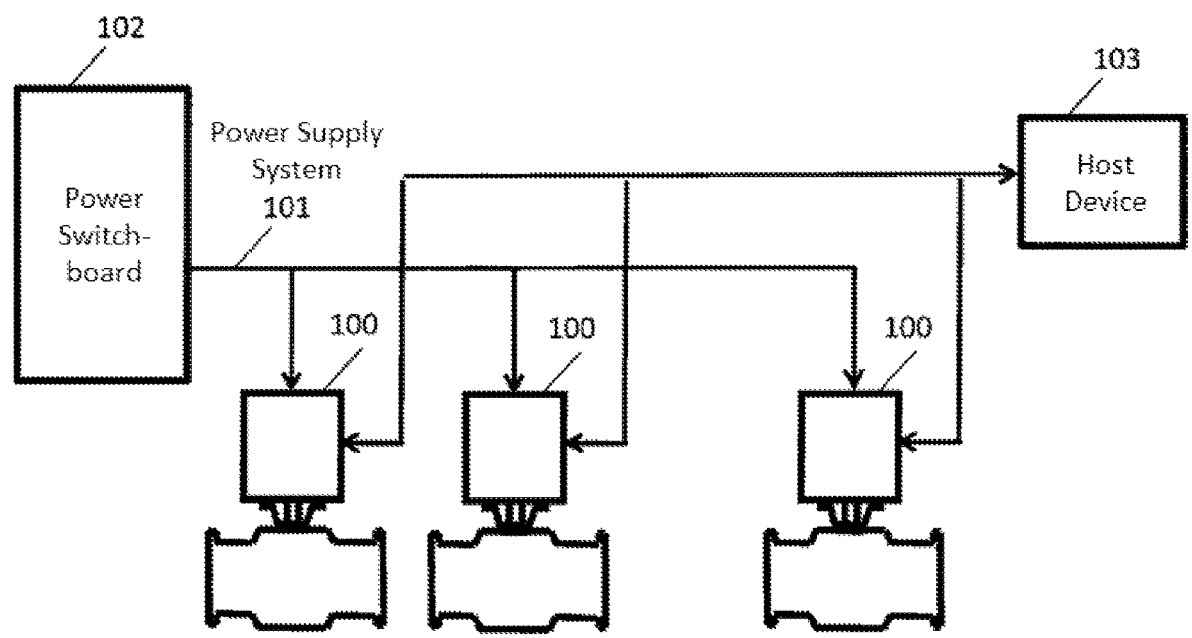
FIG. 1 is a block diagram illustrating the structure of a charge controlling system according to a first embodiment of the invention.

An embodiment of the invention will be described below with reference to the drawings. FIG. 1 is a block diagram illustrating the structure of the charge controlling system according to the first embodiment of the invention. The charge controlling system comprises a plurality of electric actuators 100 connected to one power supply system 101 and a host device 103 that controls the charging of the electric actuators 100.

Figure 2:
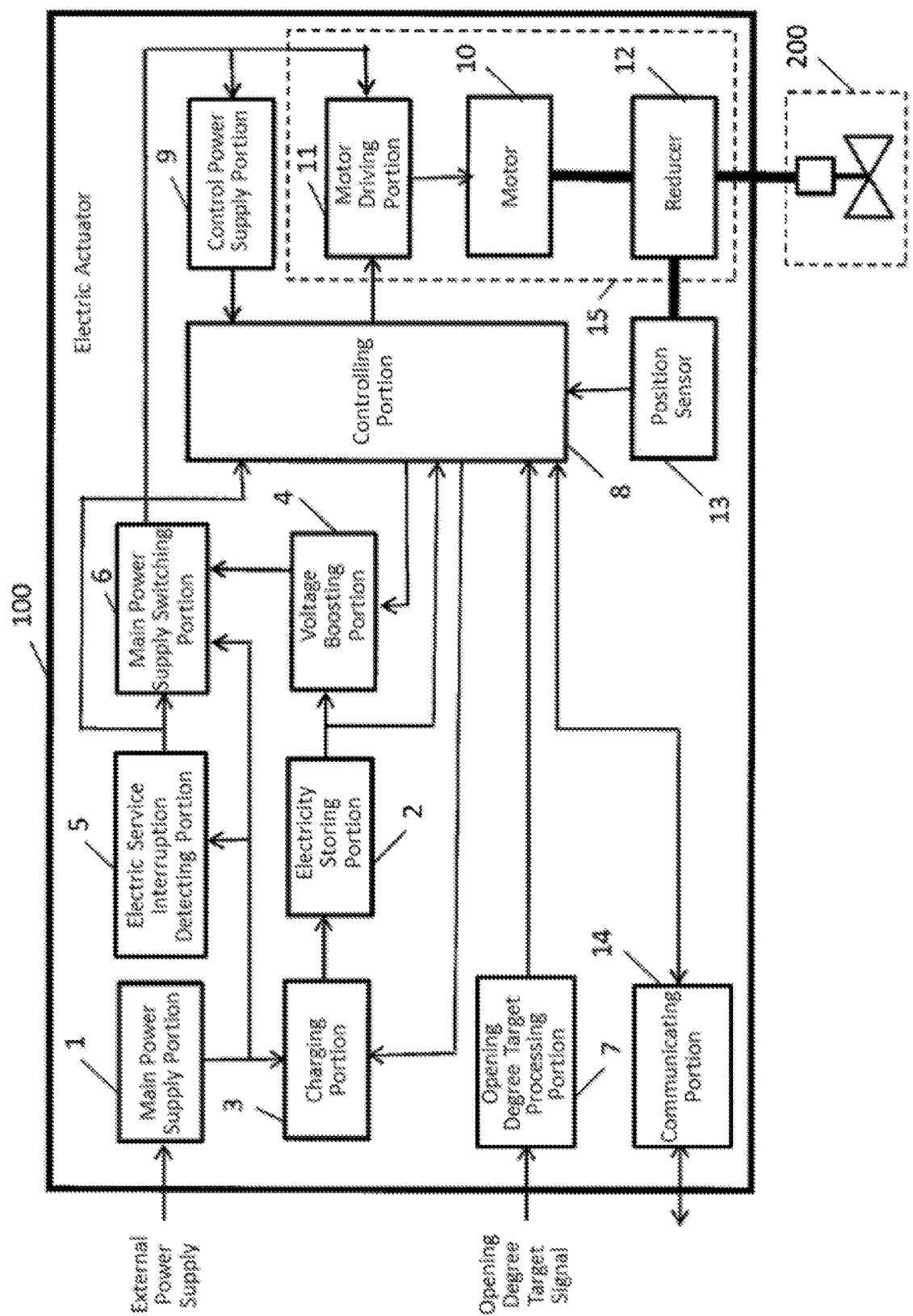
FIG. 2 is a block diagram illustrating the structure of an electric actuator according to the first embodiment of the invention.

FIG. 2 is a block diagram illustrating the structure of the electric actuator 100. The electric actuator 100 is attached to a valve 200, such as a ball valve or a butterfly valve, and they are integrated as an electric regulating valve. In addition, the electric actuator 100 exchanges information with a controller (not shown).

The electric actuator 100 comprises a main power supply portion 1 that generates a main power supply voltage from a power supply voltage supplied from an external power supply (a power switchboard 102 via power supply system 101 in FIG. 1), an electricity storing portion 2 that comprises an electric double layer capacitor in which electric energy is stored, a charging portion 3 that charges the electricity storing portion 2 when the electric actuator 100 is energized by receiving electric power from outside (external power supply, e.g., power switchboard 102 via power supply system 101 in FIG. 1), a voltage boosting portion 4 that boosts the voltage of the electricity storing portion 2, an electric service interruption detecting portion 5 that detects interruption of the electric power from outside (external power supply), a main power supply switching portion 6 that selects and outputs either the main power supply voltage from the main power supply portion 1 or the boosted power supply voltage from the voltage boosting portion 4, an opening degree target processing portion 7 that processes an opening degree target signal from a controller (not shown) and outputs an opening degree target value to a controlling portion 8, the controlling portion 8 that controls the entire electric actuator 100, a control power supply portion 9 that generates a control system power supply voltage, a motor 10 that operates according to a driving voltage, a motor driving portion 11 that outputs a driving voltage to the motor 10 according to a control signal from the controlling portion 8, a reducer 12 that operates the valve 200 by reducing the output of the motor 10, a position sensor 13 that measures the opening degree of the valve 200, and a communicating portion 14 that communicates with the host device 103. The motor 10, the motor driving portion 11, and the reducer 12 constitute a driving portion 15.

Figure 3:
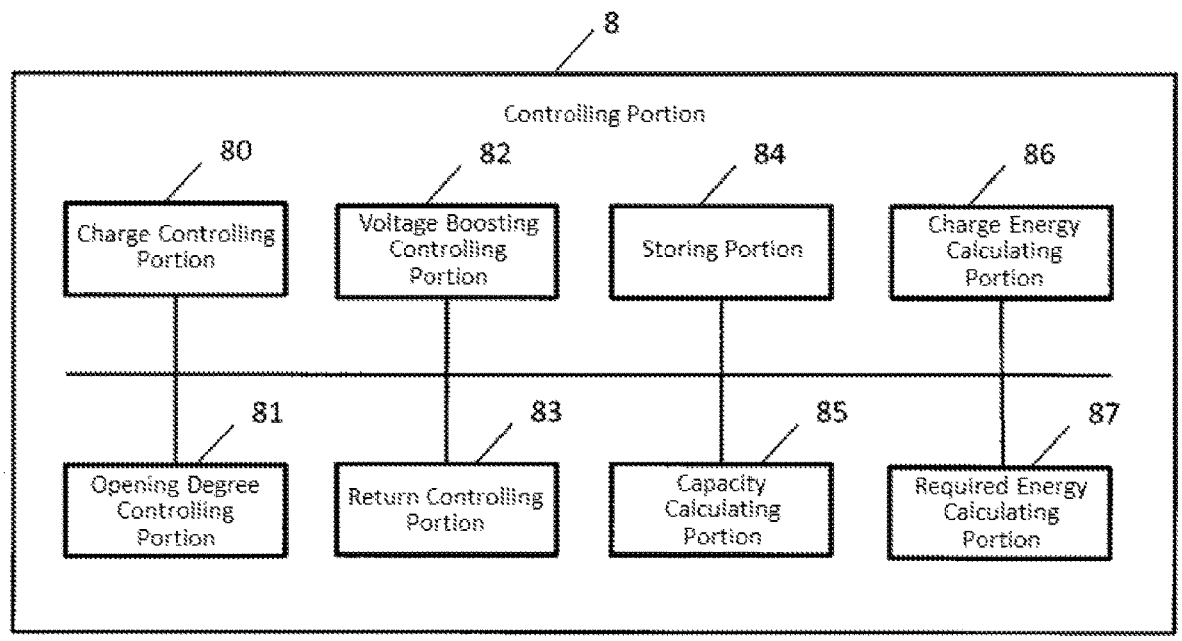
FIG. 3 is a block diagram illustrating the structure of a controlling portion of the electric actuator according to the first embodiment of the invention.

FIG. 3 is a block diagram illustrating the structure of the controlling portion 8. The controlling portion 8 comprises a charge controlling portion 80 that causes the charging portion 3 to start the charging of the electricity storing portion 2 when receiving a charge start command from the host device 103, an opening degree controlling portion 81 that controls the opening degree of the valve 200 according to the opening degree target value when electric actuator 100 is energized by receiving the electric power from outside (external power supply), a voltage boosting controlling portion 82 that outputs a voltage boosting enable signal to the voltage boosting portion 4 when interruption of electric service occurs, a return controlling portion 83 that operates the valve 200 to a desired opening position using the energy stored in the electricity storing portion 2 when interruption of electric service occurs, a storing portion 84 that stores information, a capacity calculating portion 85 that calculates the capacity of the electricity storing portion 2, a charge energy calculating portion 86 that calculates the value of the energy stored in the electricity storing portion 2, and a required energy calculating portion 87 that calculates the value of energy required to operate the valve 200 from the position indicated by the opening degree target value to a desired opening position when the electric power is turned on.

Figure 4:
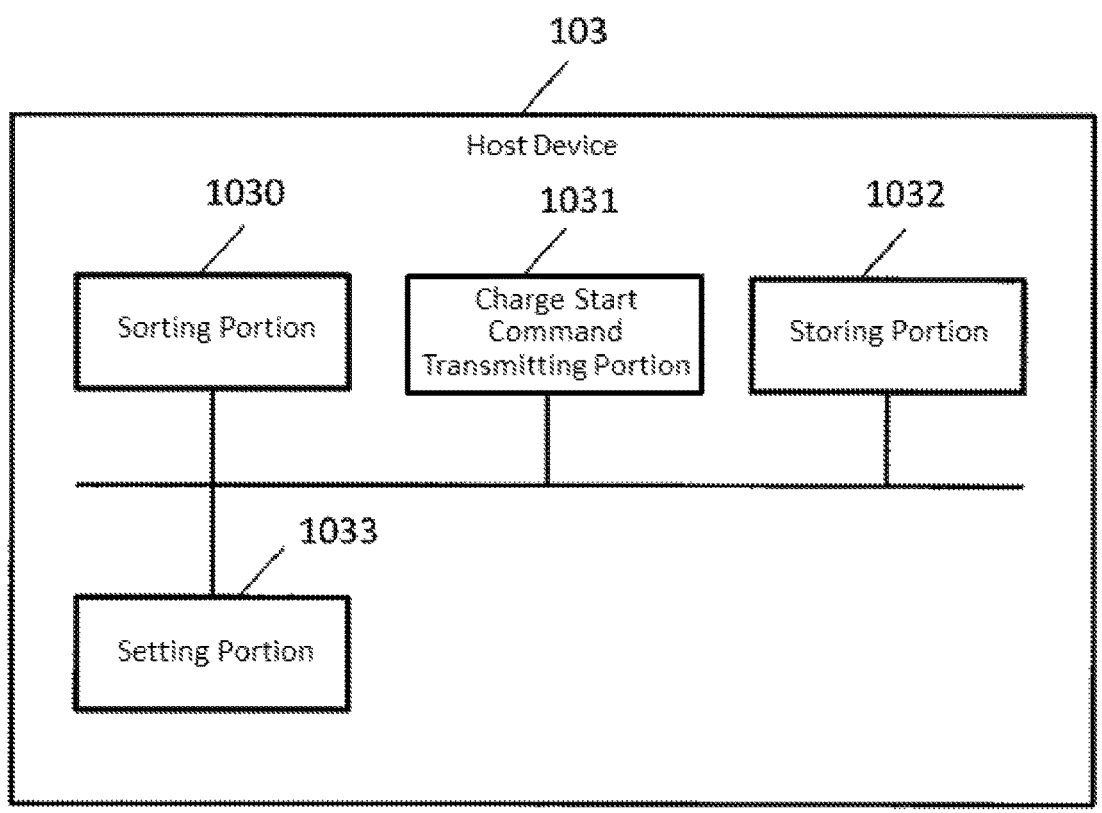
FIG. 4 is a block diagram illustrating the structure of a host device according to the first embodiment of the invention.

FIG. 4 is a block diagram illustrating the structure of the host device 103. The host device 103 comprises a sorting portion 1030 that divides the plurality of electric actuators 100 into groups according to a predetermined priority of charging, a charge start command transmitting portion 1031 that transmits charge start commands to the electric actuators 100 for each group in order of the priority, a storing portion 1032 that stores information, and a setting portion 1033 that sets information.

Figure 5:
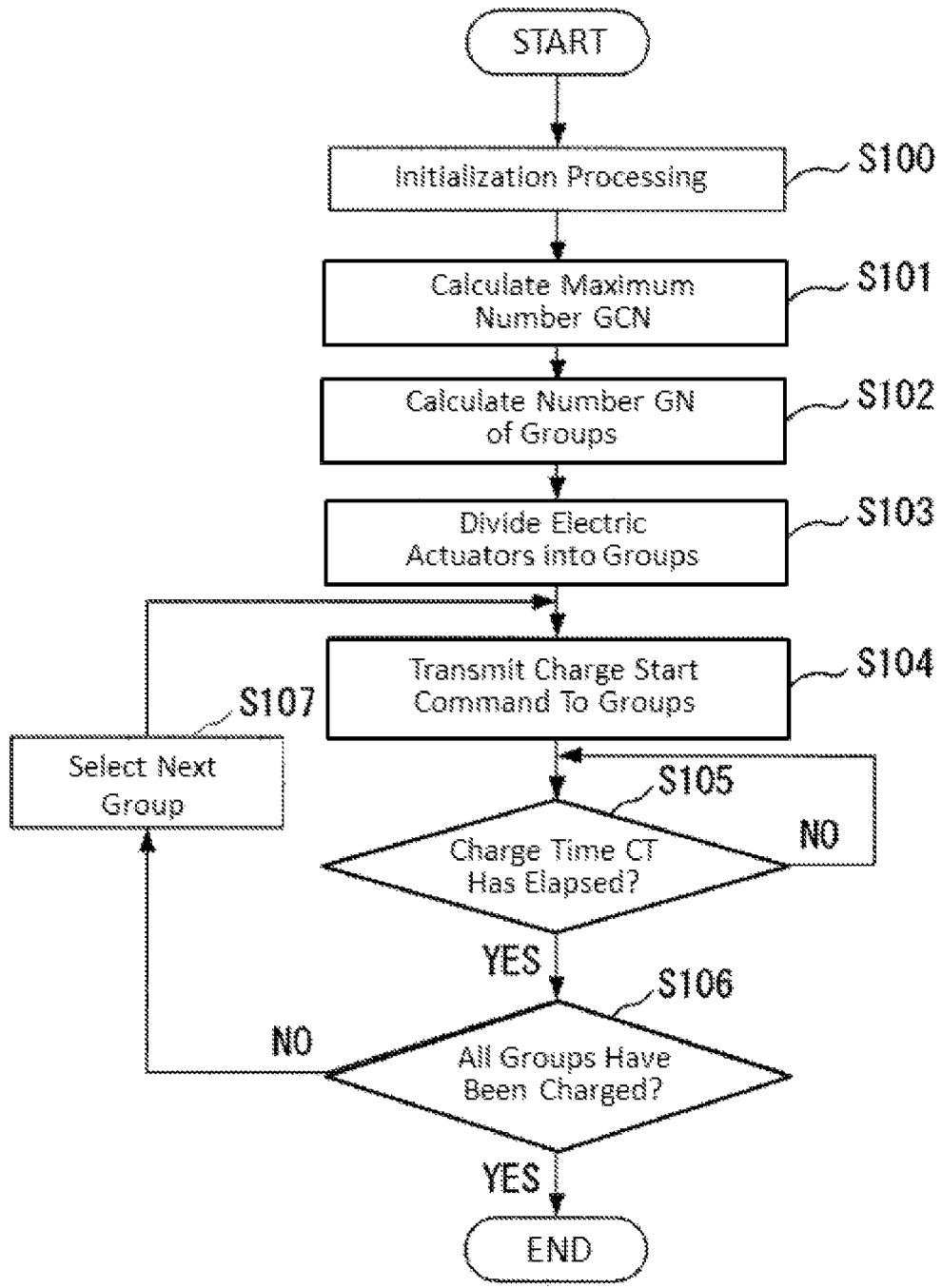
FIG. 5 is a flowchart illustrating the operation of the host device according to the first embodiment of the invention.
Figure 6:
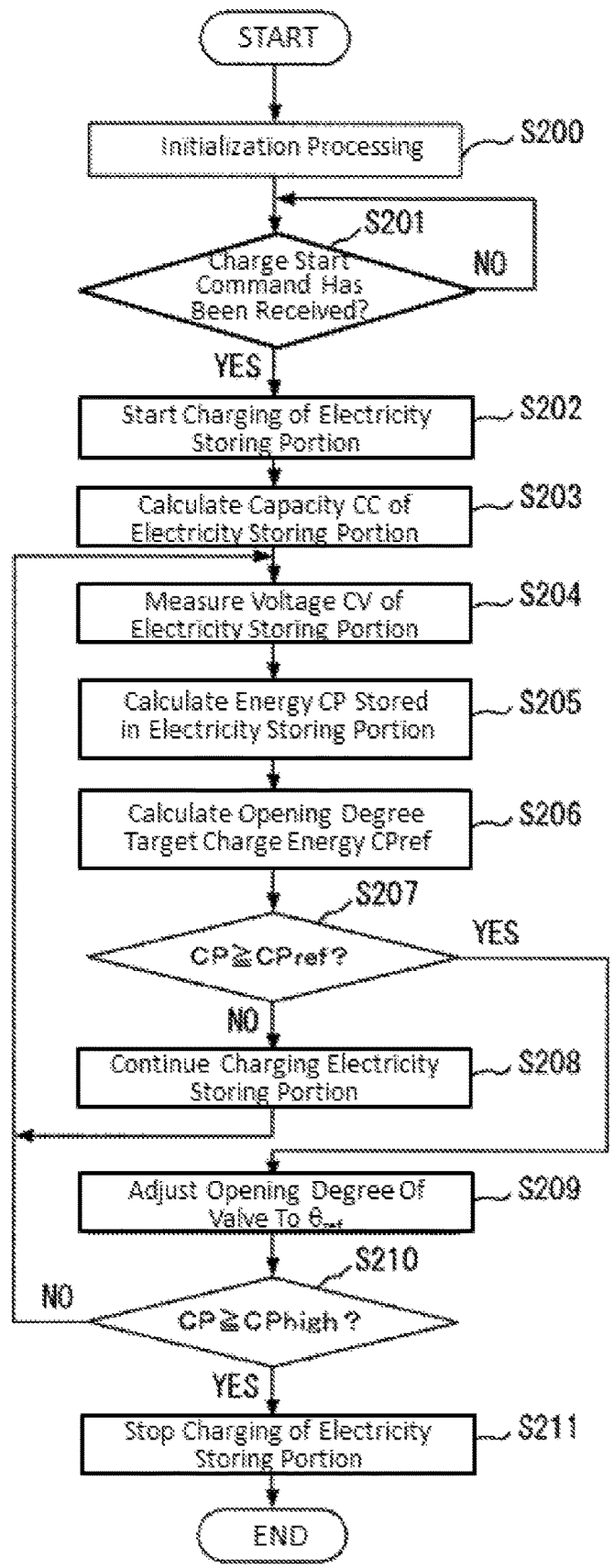

The operation of the charge controlling system according to the embodiment will be described below. FIG. 5 is a flowchart illustrating the operation of the host device 103 and FIG. 6 is a flowchart illustrating the operation of the electric actuator 100 when the electric power is turned on.

When the electric power is turned on, the host device 103 performs initialization processing that reads the programs for the operation described below from the storing portion 1032 and reads the parameters required for the operation (step S100 in FIG. 5)

The parameters preset in the storing portion 1032 comprise identification information of the plurality of target electric actuators 100 (the plurality of electric actuators 100 connected to a single power supply system 101), a maximum allowable current capacity value LMI of the power supply system 101, a current value CI, a maximum allowable power supply system charge time LMCT, a standard charge time CT (generally, maximum time required to charge the electricity storing portion 2) indicating standard time required to charge the electricity storing portion 2 of the electric actuator 100, charge priority information of the electric actuators 100 whose identification information is registered, and the like. The priority is determined by, for example, a request of a facility in which the electric actuator 100 is installed. These parameters can be set by the setting portion 1033.

On the other hand, when receiving a power supply voltage from the external power supply (the power switchboard 102 via power supply system 101 in FIG. 1), the main power supply portion 1 of the electric actuator 100 generates a predetermined main power supply voltage from this power supply voltage. It should be noted here that the power supply voltage supplied from the external power supply may be an AC or DC voltage. When an AC power supply voltage is supplied from the external power supply, it is enough for the main power supply portion 1 to generate a desired main power supply voltage by internally rectifying, smoothing, and reducing the AC voltage. Since the main power supply portion 1 supplies the main power supply voltage, the electric service interruption detecting portion 5 of the electric actuator 100 does not output an electric service interruption detection signal. Since the electric service interruption detection signal is not input from the electric service interruption detecting portion 5, the main power supply switching portion 6 of the electric actuator 100 selects and outputs the main power supply voltage from the main power supply portion 1. This supplies the main power supply voltage to the control power supply portion 9 and the motor driving portion 11 via the main power supply switching portion 6. The control power supply portion 9 of the electric actuator 100 generates a predetermined control system power supply voltage from the main power supply voltage. The controlling portion 8 of the electric actuator 100 starts up by receiving the control system power supply voltage from the control power supply portion 9.

The controlling portion 8 performs initialization processing that reads the programs for the operation described later from the storing portion 84 (step S200 in FIG. 6). Then, the controlling portion 8 waits for the charge start command from the host device 103 (step S201 in FIG. 6).

Figure 7:
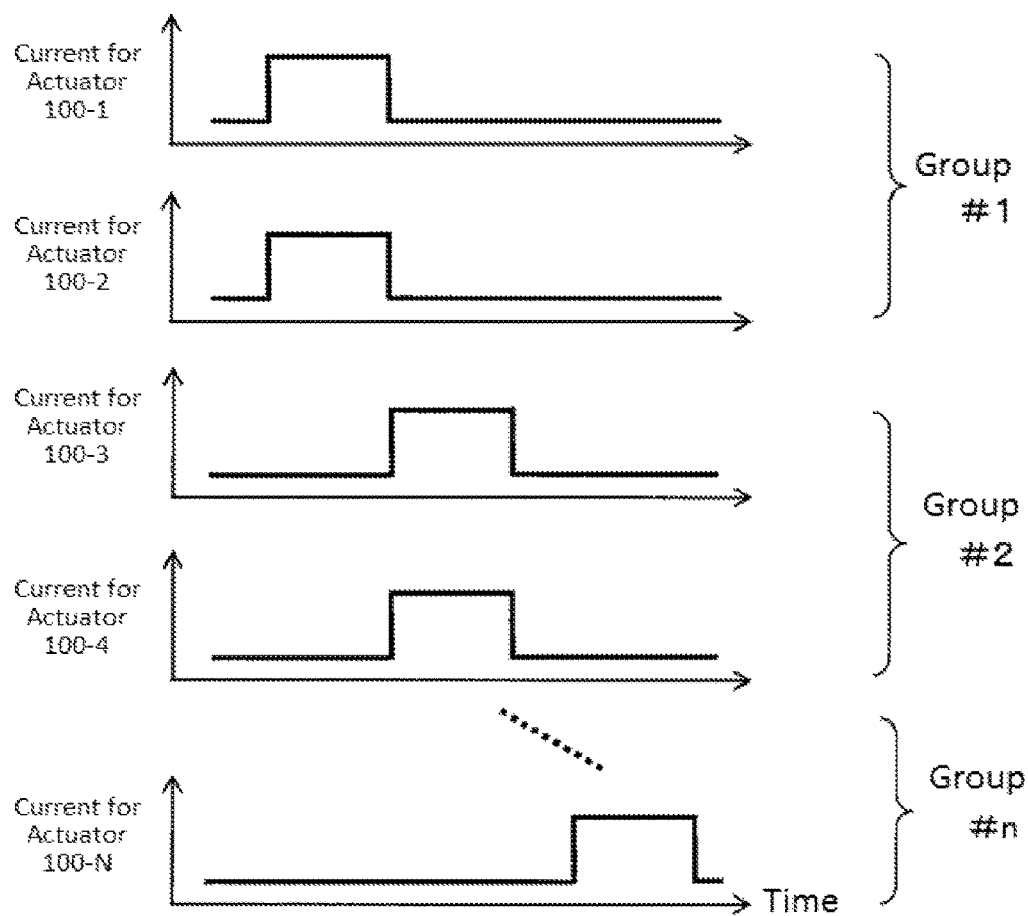
FIG. 7 shows a series of graphs used to describe how charge current flows through one power supply system to which the plurality of electric actuators according to the first embodiment of the invention is connected.

In the embodiment, when the plurality of electric actuators 100 are connected to one power supply system 101 as illustrated in FIG. 1, the electric actuators 100 are divided into a plurality of groups and the electricity storing portions 2 of the electric actuators 100 are charged for each of the groups to optimize the current capacity and the charge time. For example, FIG. 7 illustrates an example in which the N electric actuators 100-1 to 100-N are divided into groups #1, #2, . . . , #n and charging is performed for each of the groups.

When dividing the plurality of the electric actuators 100 whose identification information is registered in the storing portion 1032 into groups, the sorting portion 1030 of the host device 103 calculates the maximum number GCN of the electric actuators 100 included in one group (step S101 in FIG. 5). When significance is placed on the current capacity value of the power supply system 101, the sorting portion 1030 calculates the maximum number GCN of the electric actuators 100 included in one group using the following expression (1) based on the maximum allowable current capacity value LMI (in amperes, A) of the power supply system 101 and the current value CI (in amperes, A) flowing from the power supply system 101 to the electric actuators 100 when the electricity storing portions 2 of the electric actuators 100 are being charged.

$$GCN=LMI/CI \tag{1}$$

It should be noted here that, properly speaking, the maximum number GCN to be obtained is an integer value obtained by dropping the fractional portion of the calculation result of expression (1). As the method for charging the electricity storing portion 2 using the charging portion 3 of the electric actuator 100, there are the constant current charging method and the method (method in which the charge current changes with time) that charges the electricity storing portion 2 using an RC series circuit comprising a resistor (R) of the charging portion 3 and an electric double layer capacitor (C) of the electricity storing portion 2.

Figure 8A:
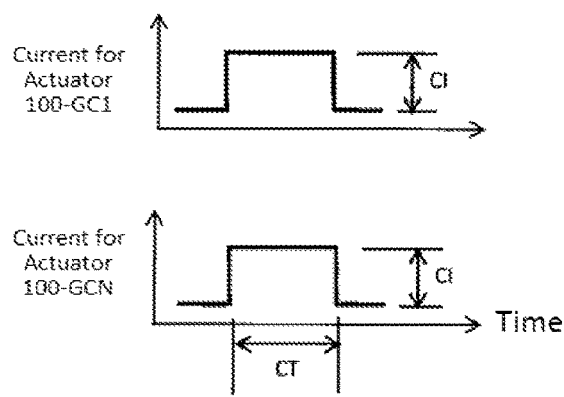
FIGS. 8A and 8B are graphs used to describe a constant current charging method.
Figure 8B:
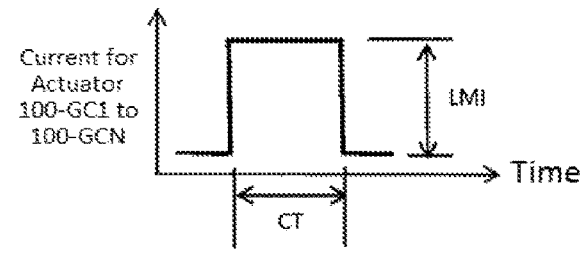

In the constant current charging method, since constant current CI flows through each of the GCN electric actuators 100-GC1 to 100-GCN belonging to a single group from the power supply system 101 as illustrated in FIG. 8 (A), a total current of LMI flows (FIG. 8 (B)). In other words, it is enough to determine the number GCN so that the total current flowing from the power supply system 101 to the GCN electric actuators 100-GC1 to 100-GCN is equal to or less than LMI.

In the charging method that uses an RC series circuit, a current of CI or less flows through each of GCN electric actuators 100-GC1 to 100-GCN belonging to a single group as illustrated in FIG. 9 (A). Accordingly, it is enough to determine the number GCN so that the maximum value of the total current flowing from the power supply system 101 to the GCN electric actuators 100-GC1 to 100-GCN is equal to or less than LMI.

In contrast, when significance is placed on the power supply system maximum charge time LMCT, the sorting portion 1030 calculates the maximum number GCN of the electric actuators 100 included in one group using the following expression (2) based on the maximum allowable power supply system charge time LMCT and the standard charge time CT (step S101 in FIG. 5).

$$GCN=LMCT/CT \tag{2}$$

That is, it is enough to determine the maximum number GCN so that the total time required to charge the electricity storing portions 2 of the plurality of electric actuators 100 whose identification information is registered in the storing portion 1032 is equal to or less than LMCT. It should be noted here that the maximum number GCN to be obtained is the integer value obtained by dropping the fractional portion of the calculation result of expression (2), as in expression (1).

The sorting portion 1030 calculates the maximum number GCN using either expression (1) or expression (2). Instruction information about whether to use expression (1) or expression (2) is preset in the storing portion 1032.

Next, the sorting portion 1030 calculates the number GN of groups using the following expression (3) based on the number N of the electric actuators 100 whose identification information is registered in the storing portion 1032 and GCN calculated by expression (1) or expression (2) (step S102 in FIG. 5).

$$GN=N/GCN \tag{3}$$

It should be noted here that, properly speaking, the number GN of groups to be obtained is the integer value obtained by rounding up the fractional portion of the calculation result of expression (3). When the maximum number GCN is calculated using expression (1), the power supply system maximum charge time LMCT required to charge the electricity storing portions 2 of the N electric actuators 100 is represented by the following expression (4).

$$LMCT=GN \times CT \tag{4}$$

Expression (4) indicates that the total charge time required when the electricity storing portions 2 of the electric actuators 100 are charged for each of groups #1 to #GN is LMCT as illustrated in FIG. 10.

In contrast, when the maximum number GCN is calculated using expression (2), the maximum current capacity value LMI (in amperes, A) of the power supply system 101 is represented by the following expression (5).

$$LMI = GCN \times CI \qquad (5)$$

Finally, the sorting portion 1030 divides the electric actuators 100 whose identification information is registered in the storing portion 1032 into a plurality of groups (step S103 in FIG. 5).

When the maximum number GCN is calculated by expression (1), the sorting portion 1030 divides the electric actuators 100 whose identification information is registered in the storing portion 1032 into groups #1 to #GN so that the total current flowing from the power supply system 101 to the electric actuators 100 being charged is equal to or less than the maximum current capacity value LMI (the number of the electric actuators 100 included in one group is equal to or less than GCN calculated in expression (1)) and the electric actuator 100 having higher priority is charged earlier.

In addition, when the maximum number GCN is calculated by expression (2), the sorting portion 1030 divides the electric actuators 100 whose identification information is registered in the storing portion 1032 into groups #1 to #GN so that the total time required to charge the electric actuators 100 is equal to or less than the maximum allowable power supply system charge time LMCT (the number of the electric actuators 100 included in one group is equal to or less than GCN calculated by expression (2)) and the electric actuator 100 having higher priority is charged earlier.

After the sorting portion 1030 finishes sorting, the charge start command transmitting portion 1031 of the host device 103 transmits charge start commands to the electric actuators 100 belonging to group #1 having the first order (highest priority) of charging (step S104 in FIG. 5) and waits for the standard charge time CT to elapse (step S105 in FIG. 5).

After receiving the charge start command from the host device 103 via the communicating portion 14 (YES in step S201 in FIG. 6), the charge controlling portion 80 of the electric actuator 100 outputs the charge enable signal to the charging portion 3 (step S202 in FIG. 6). The charging portion 3 starts the charging of the electricity storing portion 2 by receiving the main power supply voltage from the main power supply portion 1 and outputting the charge current to the electricity storing portion 2 according to the output of this charge enable signal. In addition, when the controlling portion 8 starts up, the opening degree controlling portion 81 of the controlling portion 8 obtains an opening degree target value $\theta_{ref}$ (in degrees, °) of the valve 200 from the opening degree target processing portion 7. The opening degree target processing portion 7 operates by receiving the main power supply voltage from the main power supply portion 1, receives an opening degree target signal from a controller (not illustrated), and outputs the opening degree target value $\theta_{ref}$ (in degrees, °) indicated by this opening degree target signal to the controlling portion 8.

Next, the capacity calculating portion 85 of the controlling portion 8 calculates the capacity of the electricity storing portion 2 (step S203 in FIG. 6). Since an electric double layer capacitor is used as the electricity storing portion 2 in the embodiment, the capacity value of the electricity storing portion 2 is a capacitance value CC (in farads, F) of the electric double layer capacitor. The operation of the capacity calculating portion 85 will be described with reference to FIG. 11.

Figure 11:
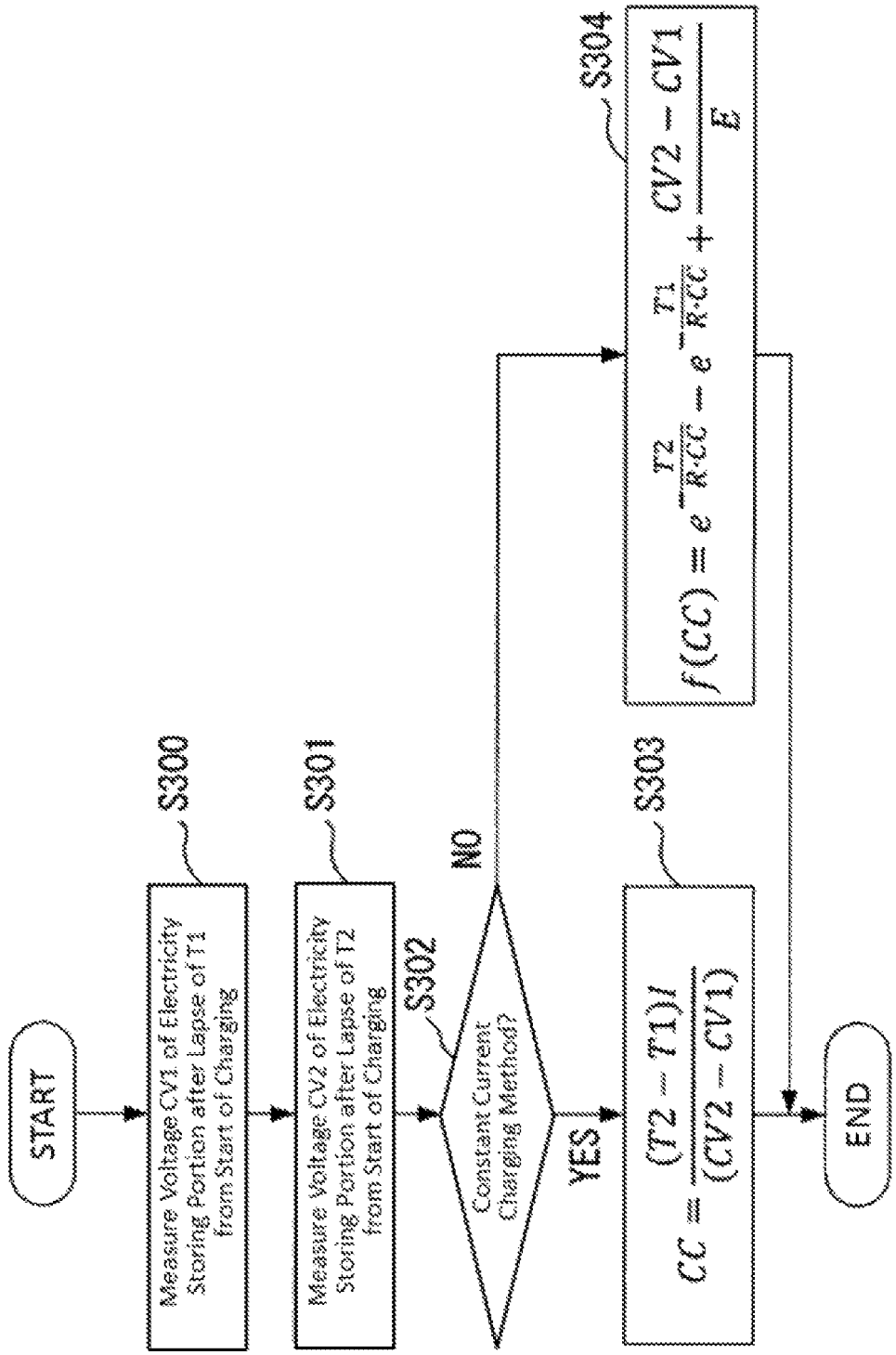
FIG. 11 is a flowchart illustrating the operation of a capacity calculating portion of the controlling portion according to the first embodiment of the invention.

First, the capacity calculating portion 85 measures the stored voltage (the inter-terminal voltage of the electric double layer capacitor) CV1 (in volts, V) of the electricity storing portion 2 after a lapse of time T1 (in seconds, s) from the start of charging (step S300 in FIG. 11). Next, the capacity calculating portion 85 measures the stored voltage CV2 (in volts, V) of the electricity storing portion 2 after a lapse of time T2 (in seconds, s) from the start of charging (step S301 in FIG. 11). It will be appreciated that T2>T1 holds.

Then, the capacity calculating portion 85 calculates the capacity value (the capacitance value of the electric double layer capacitor) CC (in farads, F) of the electricity storing portion 2 based on the measured stored voltages CV1 and CV2 (in volts, V). When the charging method for the electricity storing portion 2 by the charging portion 3 is the constant current charging method (YES in step S302 in FIG. 11), the capacity calculating portion 85 calculates the capacity value CC (in farads, F) using expression (6) below (step S303 in FIG. 11).

$$CC = \frac{(T2 - T1)I}{(CV2 - CV1)} \qquad (6)$$

In the method that charges the electricity storing portion 2 with constant current I (constant current charging method) (YES in step S302), the capacity calculating portion 85 calculates the capacity value CC (in farads, F) using expression (6) (step S303 in FIG. 11). In addition, in the method (method in which the charge current changes with time) that charges the electricity storing portion 2 using an RC series circuit comprising the resistor of the charging portion 3 and the double layer capacitor of the electricity storing portion 2 (NO in step S302), the capacity calculating portion 85 calculates the capacity value CC (in farads, F) using expression (7) below (step S304 in FIG. 11).

$$f(CC) = e^{-\frac{T2}{R \cdot CC}} - e^{-\frac{T1}{R \cdot CC}} + \frac{CV2 - CV1}{E} \qquad (7)$$

In expression (7), R (in ohms, Ω) represents the resistance value of the resistor of the charging portion 3 and E represents the charging power supply voltage value applied to the RC series circuit by the charging portion 3. Since f(CC) in expression (7) surely has a solution for 0<CC<CCmax, the capacity value CC (in farads, F) can be calculated by obtaining the solution using numerical analysis, such as the Bisection method or Newton's method (CCmax (in farads, F) is the maximum value in the initial capacitance range). Now, the processing by the capacity calculating portion 85 is completed.

Next, the charge energy calculating portion 86 of the controlling portion 8 calculates energy CP (in joules, J) stored in the electricity storing portion 2. Specifically, the charge energy calculating portion 86 measures the stored voltage CV (in volts, V) of the electricity storing portion 2 (step S204 in FIG. 6). Then, the charge energy calculating portion 86 calculates the energy CP (in joules, J) using expression (8) based on the capacity value CC (in farads, F) of the electricity storing portion 2 calculated by the capacity calculating portion 85 and the measured stored voltage CV (in volts, V) (step S205 in FIG. 6).

$$CP = \frac{CV^2 \cdot CC}{2} \quad (8)$$

The required energy calculating portion 87 of the controlling portion 8 calculates opening degree target charge energy CPref (in joules, J), which is the energy required to return the valve 200 to a desired opening position (the fully closed position in the embodiment) from the current target opening position using expression (9) (step S206 in FIG. 6).

$$CPref = \left(\frac{MT \cdot \frac{2\pi N}{60}}{\eta_{mc}\eta_{mt}\eta_{ps}} + \frac{CTP}{\eta_{ps}}\right)\left(\frac{\theta_{ref} T_{open}}{\theta_{open}}\right) \quad (9)$$

In expression (9), MT (in newton-meters, N·m) represents the load torque value of a known valve stem of the valve 200, N (in revolutions per minute, rpm) represents the known number of revolutions of the valve stem of the valve 200 driven by the reducer 12, CTP (in watts, W) represents the known electric power value (the power consumption value of the return controlling portion 83 and the voltage boosting controlling portion 82 that operate when interruption of electric service occurs) consumed by the controlling portion 8, $\theta_{oper}$, (in degrees, °) represents the fully open opening value of the valve 200, $T_{open}$ (in seconds, s) represents the fully open operation time value, which is the known time required for the valve 200 to reach the fully open position from the fully closed position, $\eta_{mc}$ (in a percentage, %) represents the known machine efficiency of the reducer 12, $\eta_{mt}$ (in a percentage, %) represents the known efficiency of the motor 10, and $\eta_{ps}$ (in a percentage, %) represents the known efficiency of the voltage boosting portion 4. The torque MT (in newton-meters, N·m), the number N of revolutions (in revolutions per minute, rpm), the fully open operation time $T_{open}$ (in seconds, s), the machine efficiency $\eta_{mc}$ (in a percentage, %) of the reducer 12, and the efficiency $\eta_{mt}$ (in a percentage, %) of the motor 10 represent the performance of the driving portion 15.

When CP<CPref holds, that is, the energy CP (in joules, J) stored in the electricity storing portion 2 does not reach the opening degree target charge energy CPref (in joules, J) (NO in step S207 in FIG. 6), the charge controlling portion 80 of the controlling portion 8 decides that the charging required to return the valve 200 is insufficient, continues outputting the charge enable signal, and causes the charging portion 3 to continue charging the electricity storing portion 2 (step S208 in FIG. 6).

In this way, the processing from step S204 to S208 is repeatedly executed until the energy CP (in joules, J) stored in the electricity storing portion 2 reaches the opening degree target charge energy CPref (in joules, J).

When CP≥CPref holds, that is, the energy CP (in joules, J) stored in the electricity storing portion 2 is equal to or more than the opening degree target charge energy CPref (in joules, J) (YES in step S207), the opening degree controlling portion 81 of the controlling portion 8 compares the opening degree target value $\theta_{ref}$ with an actual measurement value (actual opening) of the opening degree of the valve 200 measured by the position sensor 13 and outputs a motor control signal to the motor driving portion 11 so that the opening degree target value $\theta_{ref}$ coincides with the actual opening. The motor driving portion 11 outputs a driving voltage to the motor 10 according to the motor control signal. This drives the motor 10, the driving force of the motor 10 is transmitted to the valve stem of the valve 200 via the reducer 12, and the opening degree of the valve 200 is adjusted by operating a valve body attached pivotally to this valve stem. In this way, the opening degree of the valve 200 is adjusted to $\theta_{ref}$ (in degrees, °) (step S209 in FIG. 6). The position sensor 13 detects the amount of displacement of the valve stem of the valve 200 via the reducer 12 and transmits the actual measurement value (actual opening) of the valve opening degree to the controlling portion 8.

Next, when CP<CPhigh holds, that is, the energy CP (in joules, J) stored in the electricity storing portion 2 does not reach a predetermined charge energy upper limit value CPhigh (in joules, J) (NO in step S210 in FIG. 6), the charge controlling portion 80 of the controlling portion 8 returns to step S204.

In this way, the processing from step S204 to S210 is repeatedly executed until the energy CP (in joules, J) stored in the electricity storing portion 2 reaches the charge energy upper limit value CPhigh (in joules, J).

The charge energy upper limit value CPhigh (in joules, J) is obtained by adding the energy of self-discharge of the electricity storing portion 2 to the fully open return charging electric power, which is the energy required to return the valve 200 to a desired opening position (the fully closed position in the embodiment) from the fully open position. Practically, it is enough to set this upper limit value to the value obtained by increasing the fully open return charging electric power by several tens of percent.

When CP≥CPhigh holds, that is, the energy CP (in joules, J) stored in the electricity storing portion 2 is equal to or more than the charge energy upper limit value CPhigh (in joules, J) (YES in step S210), the charge controlling portion 80 stops the outputting of the charge enable signal and causes the charging portion 3 to stop the charging of the electricity storing portion 2 (step S211 in FIG. 6).

Now, the operation of the controlling portion 8 when the electric power is turned on is completed and then normal operation is performed.

Figure 12:
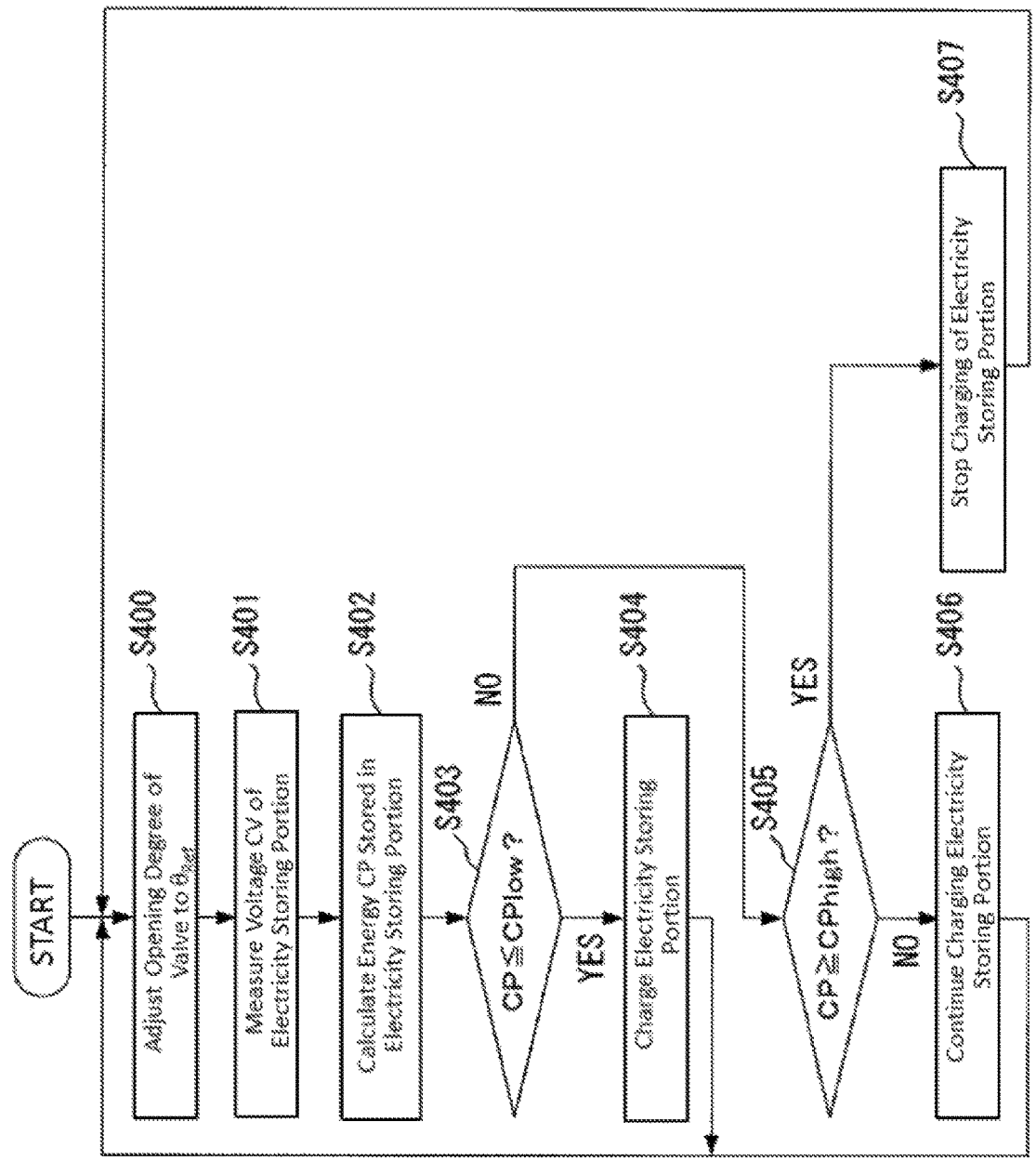
FIG. 12 is a flowchart illustrating the operation of the electric actuator according to the first embodiment of the invention in normal times.

FIG. 12 is a flowchart illustrating the operation of the electric actuator 100 in normal times. The processing (step S400 in FIG. 12) for adjusting the opening degree of the valve 200 to $\theta_{ref}$ (in degrees, °) is the same as in step S209. It will be appreciated that, if necessary, the controller (not shown) changes the opening degree target value $\theta_{ref}$ (in degrees, °) as appropriate.

Next, the charge energy calculating portion 86 of the controlling portion 8 measures the stored voltage CV (in volts, V) of the electricity storing portion 2 (step S401 in FIG. 12). Then, as in step S205 of FIG. 6, the charge energy calculating portion 86 calculates the energy CP (in joules, J) stored in the electricity storing portion 2 using expression (8) based on the capacity value CC (in farads, F) of the electricity storing portion 2 calculated by the capacity calculating portion 85 in step S203 and the stored voltage CV (in volts, V) measured in step S401 (step S402 in FIG. 12).

When CP≤CPlow holds, that is, the energy CP (in joules, J) stored in the electricity storing portion 2 is equal to or less than a predetermined charge energy lower limit value CPlow (in joules, J) (YES in step S403 in FIG. 12), the charge controlling portion 80 of the controlling portion 8 outputs the charge enable signal to the charging portion 3 and causes the charging portion 3 to start the charging of the electricity storing portion 2 (step S404 in FIG. 12).

In this way, the processing from step S400 to S404 is repeatedly executed until the energy CP (in joules, J) stored in the electricity storing portion 2 exceeds the charge energy lower limit value CPlow (in joules, J).

The charge energy lower limit value CPlow (in joules, J) is the fully open return charging electric power, which is the energy required to return the valve 200 to a desired opening position (the fully closed position in the embodiment) from the fully open position.

When CP>CPlow holds, that is, the energy CP (in joules, J) stored in the electricity storing portion 2 exceeds the charge energy lower limit value CPlow (in joules, J) (NO in step S403), the charge controlling portion 80 decides whether the energy CP (in joules, J) is equal to or more than the predetermined charge energy upper limit value CPhigh (in joules, J) (step S405 in FIG. 12).

When CP<CPhigh holds, that is, the energy CP (in joules, J) stored in the electricity storing portion 2 does not reach the charge energy upper limit value CPhigh (in joules, J) (NO in step S405), the charge controlling portion 80 continues outputting the charge enable signal and causes the charging portion 3 to continue charging the electricity storing portion 2 (step S406 in FIG. 12).

In this way, the processing from step S400 to S406 is repeatedly executed until the energy CP (in joules, J) stored in the electricity storing portion 2 reaches the charge energy upper limit value CPhigh (in joules, J).

When CP≥CPhigh holds, that is, the energy CP (in joules, J) stored in the electricity storing portion 2 is equal to or more than the charge energy upper limit value CPhigh (in joules, J) (YES in step S405), the charge controlling portion 80 stops the outputting of the charge enable signal, causes the charging portion 3 to stop the charging of the electricity storing portion 2 (step S407 in FIG. 12), and returns to step S400. The above processing in FIG. 12 is continued until the electric power is shut off.

On the other hand, the charge start command transmitting portion 1031 of the host device 103 decides whether the standard charge time CT has elapsed after transmitting the charge start command (step S105 in FIG. 5).

If so (YES in step S105 in FIG. 5), since group #2 having the second order of charging has not been charged (NO in step S106 in FIG. 5), the charge start command transmitting portion 1031 selects the next group #2 as the transmission destination of charge start commands (step S107 in FIG. 5), returns to step S104, and transmits the charge start commands to the electric actuators 100 belonging to group #2 having second order of charging.

In this way, the processing from step S104 to step S107 is repeatedly executed until the electricity storing portions 2 of the electric actuators 100 have been charged for all groups #1 to #GN by transmitting the charge start commands to groups #1 to #GN in sequence. The host device 103 ends the processing when all groups #1 to #GN have been charged.

Next, the operation of the electric actuator 100 when interruption of electric service occurs will be described with reference to FIG. 13. When the supply of the power supply voltage from the external power supply (the power switchboard 102 via power supply system 101 in FIG. 1) to the main power supply portion 1 is stopped for any reason (YES in step S500 in FIG. 13), since the main power supply portion 1 cannot generate the main power supply voltage, the electric service interruption detecting portion 5 outputs the electric service interruption detection signal (step S501 in FIG. 13).

Figure 13:
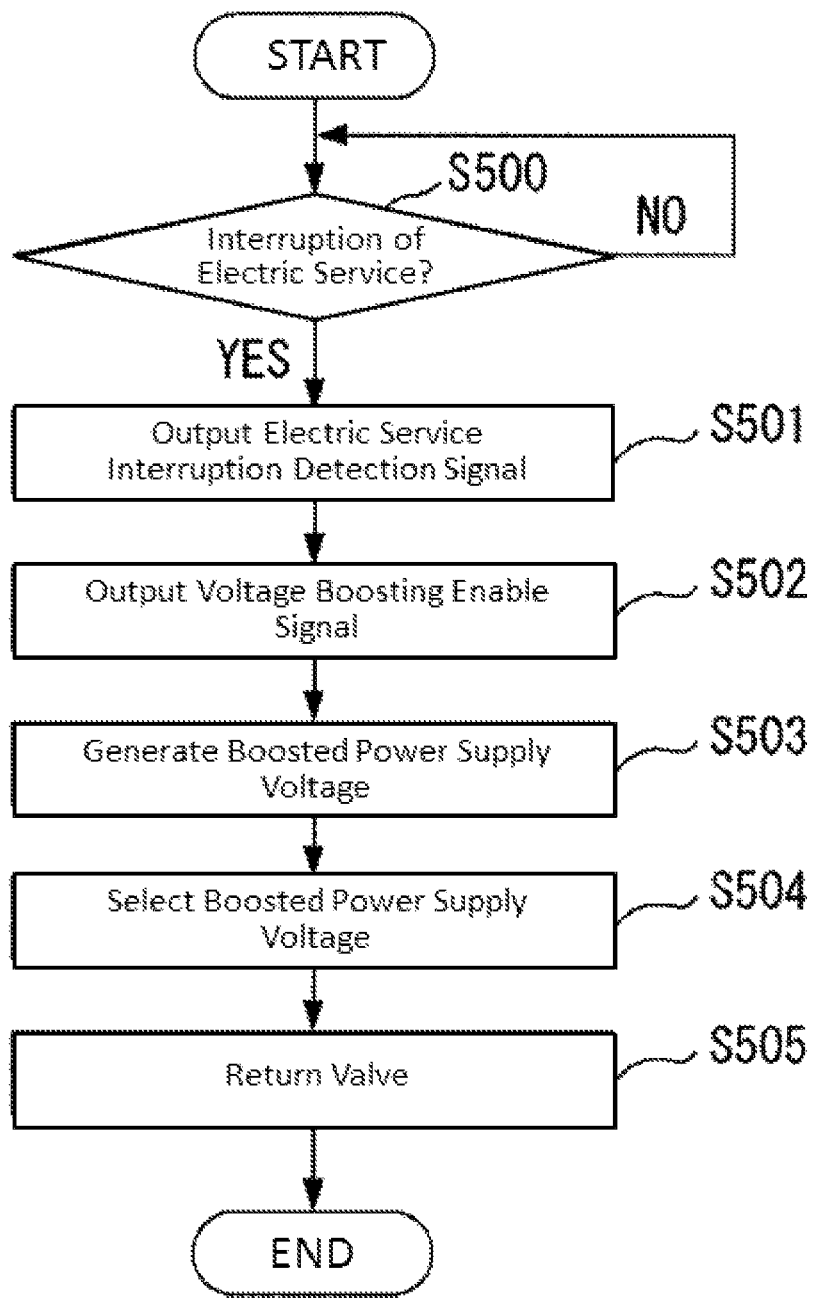
FIG. 13 is a flowchart illustrating the operation of the electric actuator according to the first embodiment of the invention when interruption of electric service occurs.

The voltage boosting controlling portion 82 of the controlling portion 8 outputs the voltage boosting enable signal to the voltage boosting portion 4 immediately after the electric service interruption detecting portion 5 outputs the electric service interruption detection signal (step S502 in FIG. 13).

In response to the output of the voltage boosting enable signal, the voltage boosting portion 4 boosts the stored voltage (the inter-terminal voltage of the electric double layer capacitor) of the electricity storing portion 2 to a value equivalent to the main power supply voltage (step S503 in FIG. 13).

When the electric service interruption detecting portion 5 outputs the electric service interruption detection signal, the main power supply switching portion 6 selects and outputs the boosted power supply voltage from the voltage boosting portion 4 (step S504 in FIG. 13). This supplies the boosted power supply voltage to the control power supply portion 9 and the motor driving portion 11 via the main power supply switching portion 6. The control power supply portion 9 generates a predetermined control system power supply voltage by reducing the boosted power supply voltage.

Next, the return controlling portion 83 of the controlling portion 8 outputs the motor control signal to the motor driving portion 11 so that a desired opening position (the fully closed position in the embodiment) coincides with the actual opening of the valve 200 measured by the position sensor 13. The motor driving portion 11 outputs a driving voltage to the motor 10 according to the motor control signal. This drives the motor 10 and adjusts the opening degree of the valve 200. In this way, the valve 200 can be returned to a desired opening position (step S505 in FIG. 13).

Since the host device 103 divides the plurality of electric actuators 100 connected to one power supply system 101 into groups, transmits charge start commands for each of the groups, and charges the electricity storing portions 2 of the electric actuators 100 for each of the groups in the embodiment as described above, the current capacity required for the power supply system 101 and the power switchboard 102 and the total charge time for the electric actuators 100 can be optimized. In addition, in the embodiment, the electricity storing portions 2 of the electric actuators 100 can be charged according to the priority by dividing the electric actuators into groups according to the priority of charging of the electric actuators 100.

In addition, as compared with a spring return actuator, the embodiment has advantages in that (I) a torque for winding a spring is not necessary, (II) the target position of the valve during occurrence of interruption of electric service can be set to the fully closed position, the fully open position, or another predetermined position, and (III) mechanisms, such as a clutch and brake, for controlling operation during occurrence of interruption of electric service are not necessary.

Since the current capacities of the power supply system 101 and the power switchboard 102 can be suppressed in the embodiment, a spring return actuator can be replaced with the electric actuator of the embodiment having various advantages, thereby achieving contribution to reduction in environmental load by reducing power consumption during operation and reducing a mechanism required for control during a return. In addition, application of the electric actuator can be extended to general industrial machines having a spring return actuator.

Second Embodiment

Figure 14:
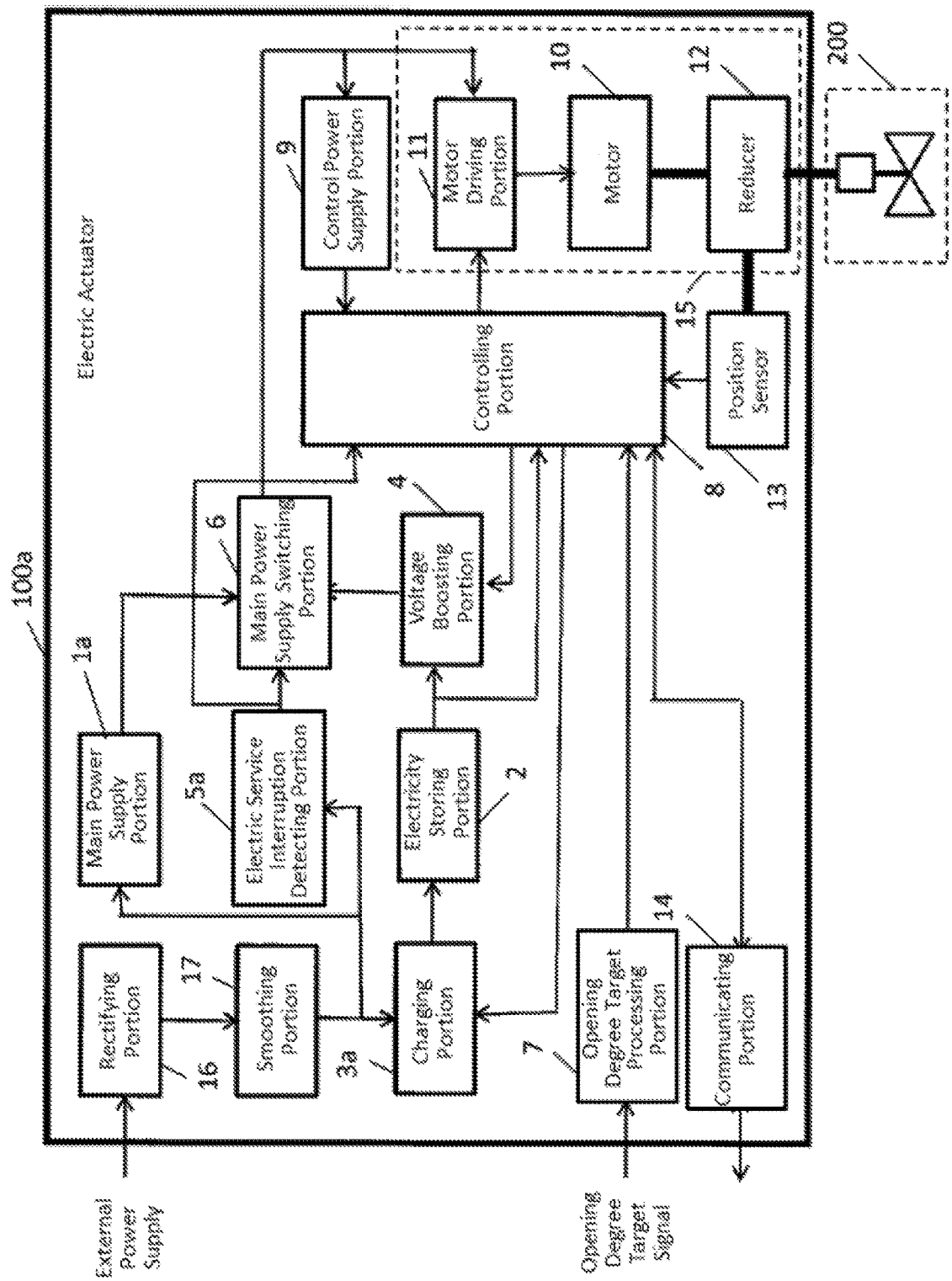
FIG. 14 is a block diagram illustrating the structure of an electric actuator according to a second embodiment of the invention.

Next, the second embodiment of the invention will be described. In the embodiment, the structure of an electric actuator different from the first embodiment will be described. Also in the embodiment, the entire structure of the charge controlling system is the same as in the first embodiment. FIG. 14 is a block diagram illustrating the structure of an electric actuator 100a according to the embodiment and the same components as in FIG. 2 are given the same reference numerals.

The electric actuator 100a comprises a main power supply portion 1a, the electricity storing portion 2, a charging portion 3a, the voltage boosting portion 4, an electric service interruption detecting portion 5a, the main power supply switching portion 6, the opening degree target processing portion 7, the controlling portion 8, the control power supply portion 9, the motor 10, the motor driving portion 11, the reducer 12, the position sensor 13, the communicating portion 14, a rectifying portion 16 that rectifies the power supply voltage supplied from the external power supply (the power switchboard 102 via power supply system 101 in FIG. 1), and a smoothing portion 17 that smooths a DC voltage rectified by the rectifying portion 16.

The first embodiment corresponds to a case in which the power supply voltage supplied from the external power supply is a high voltage of, for example, 85 VAC to 264 VAC. In contrast, the second embodiment corresponds to a case in which the power supply voltage supplied from the external power supply is a low voltage of, for example, 24 VAC.

The rectifying portion 16 rectifies the AC power supply voltage from the external power supply. The smoothing portion 17 smooths a pulsating DC voltage rectified by the rectifying portion 16.

The main power supply portion 1a according to the embodiment generates the main power supply voltage as the main power supply portion 1 according to the first embodiment, except that the main power supply portion 1a receives a DC power supply voltage output from the smoothing portion 17.

The charging portion 3a charges the electricity storing portions 2 according to the charge enable signal from the controlling portion 8 as the charging portion 3 according to the first embodiment, except that the charging portion 3a receives the DC power supply voltage output from the smoothing portion 17.

The electric service interruption detecting portion 5a detects the shut-off of the electric power as the electric service interruption detecting portion 5 according to the first embodiment, except that the electric service interruption detecting portion 5a receives the DC power supply voltage output from the smoothing portion 17.

The remaining structure is the same as in the first embodiment.

As described above, the same effects as in the first embodiment can be obtained even in the electric actuator connected to a low voltage external power supply. Although the power supply voltage supplied from the external power supply is an AC voltage in the above example, it will be appreciated that the power supply voltage supplied from the external power supply may be a DC voltage.

Third Embodiment

Figure 15:
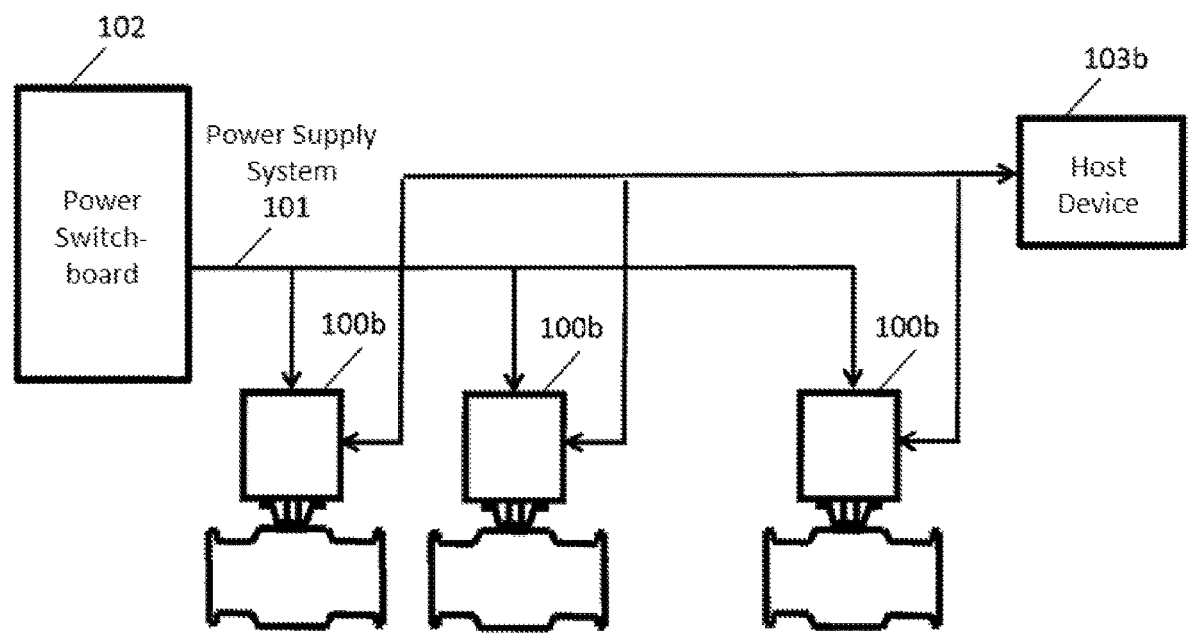
FIG. 15 is a block diagram illustrating the structure of a charge controlling system according to a third embodiment of the invention.

Next, the third embodiment of the invention will be described. FIG. 15 is a block diagram illustrating the structure of the charge controlling system according to the third embodiment of the invention. The charge controlling system according to the embodiment comprises a plurality of electric actuators 100b connected to one power supply system 101 and a host device 103b that controls the charging of the electric actuators 100b.

Figure 16:
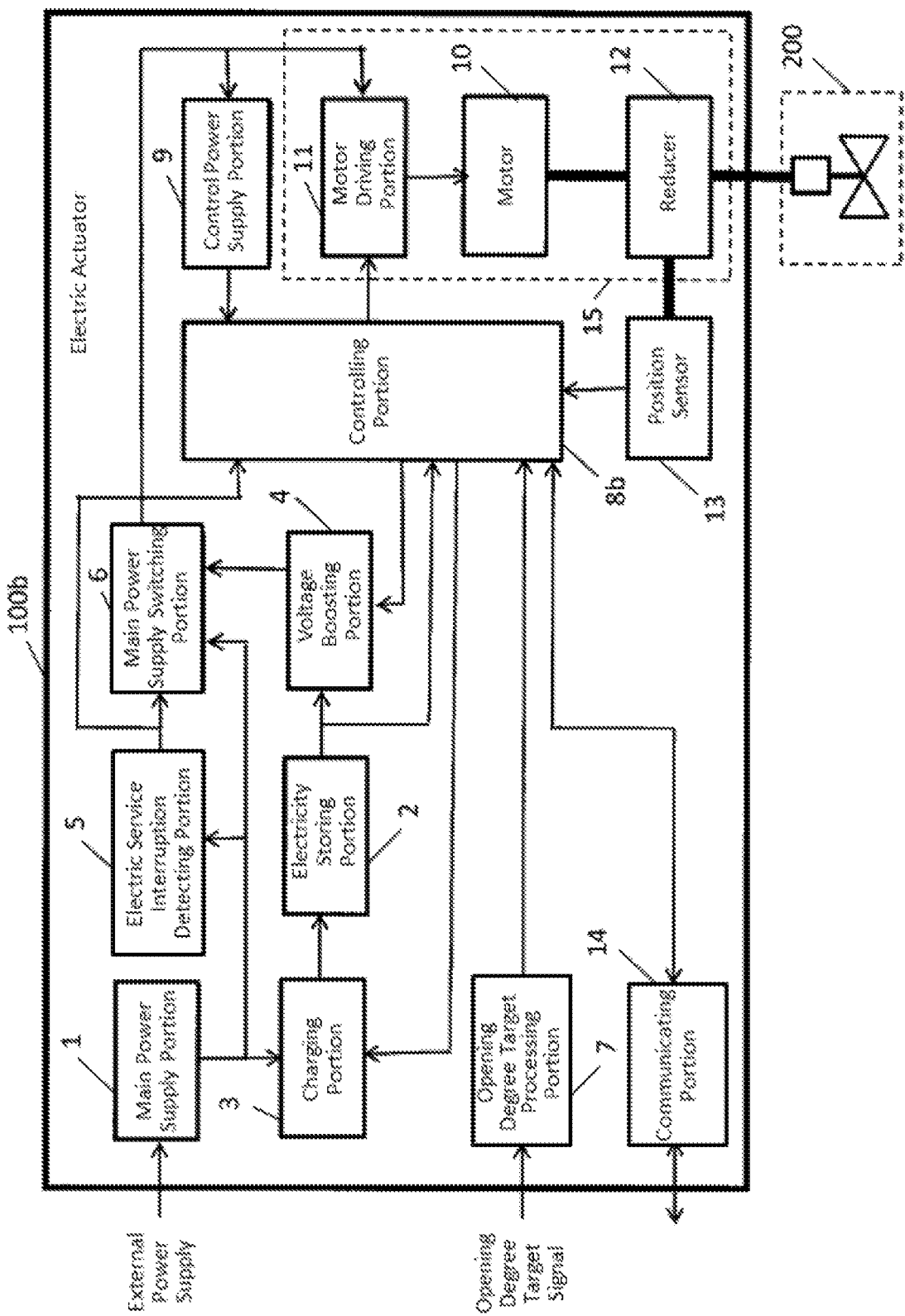
FIG. 16 is a block diagram illustrating the structure of an electric actuator according to the third embodiment of the invention.

FIG. 16 is a block diagram illustrating the structure of the electric actuator 100b according to the embodiment and the same components as in FIG. 2 are given the same reference numerals. The electric actuator 100b comprises the main power supply portion 1, the electricity storing portion 2, the charging portion 3, the voltage boosting portion 4, the electric service interruption detecting portion 5, the main power supply switching portion 6, the opening degree target processing portion 7, a controlling portion 8b, the control power supply portion 9, the motor 10, the motor driving portion 11, the reducer 12, the position sensor 13, and the communicating portion 14.

Figure 17:
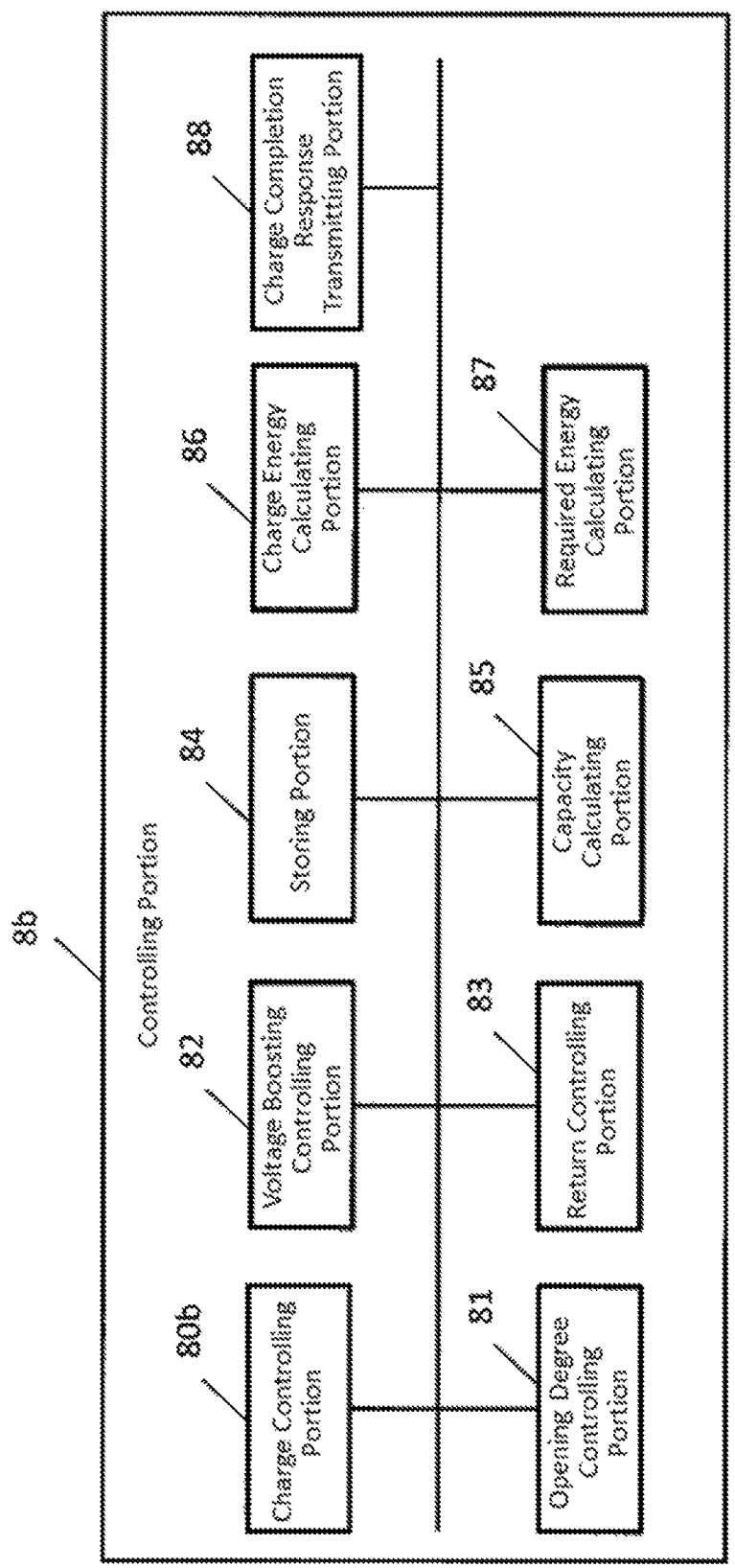
FIG. 17 is a block diagram illustrating the structure of a controlling portion of the electric actuator according to the third embodiment of the invention.

FIG. 17 is a block diagram illustrating the structure of the controlling portion 8b of the electric actuator 100b according to the embodiment and the same components as in FIG. 3 are given the same reference numerals. The controlling portion 8b comprises a charge controlling portion 80b, the opening degree controlling portion 81, the voltage boosting controlling portion 82, the return controlling portion 83, the storing portion 84, the capacity calculating portion 85, the charge energy calculating portion 86, the required energy calculating portion 87, and a charge completion response transmitting portion 88 that transmits the charge completion response to the host device 103b when the electricity storing portion 2 has been charged.

Figure 18:
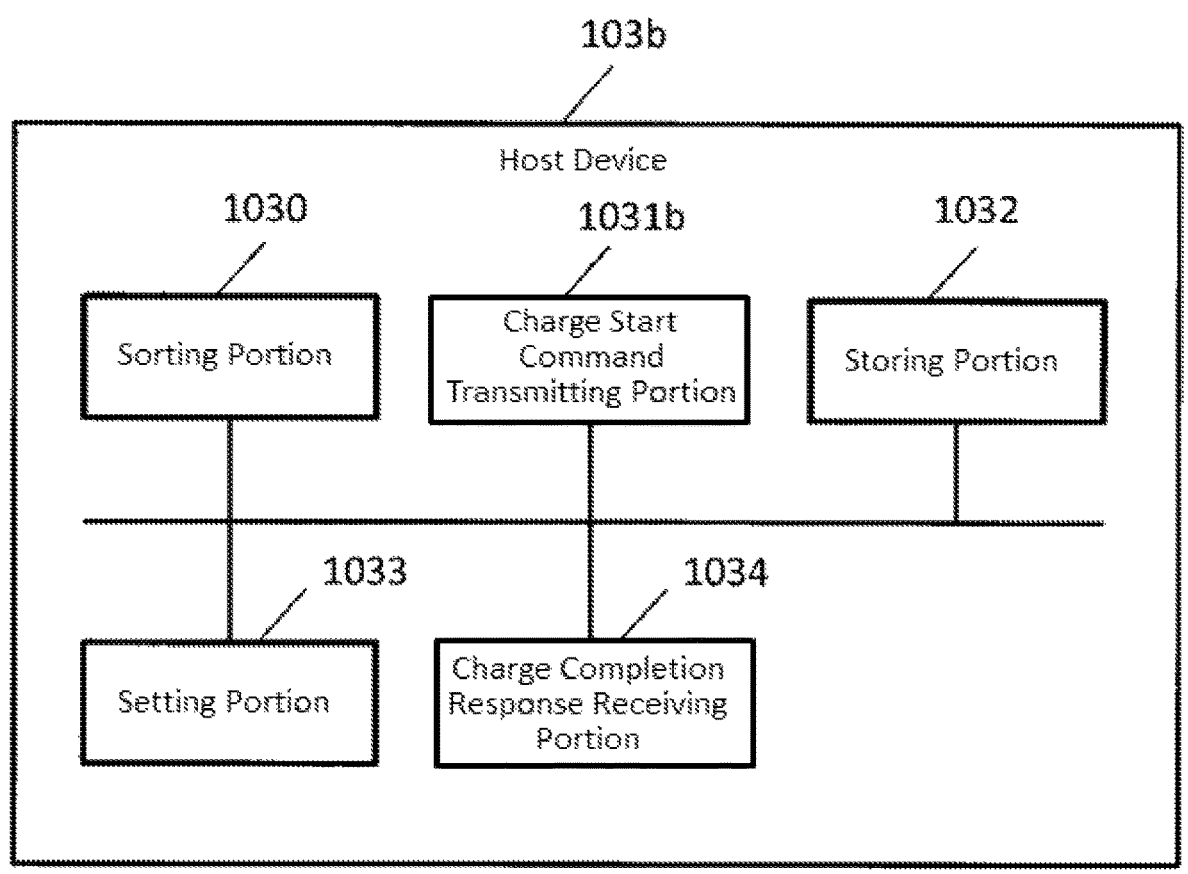
FIG. 18 is a block diagram illustrating the structure of a host device according to the third embodiment of the invention.

FIG. 18 is a block diagram illustrating the structure of the host device 103b according to the embodiment and the same components as in FIG. 4 are given the same reference numerals. The host device 103b comprises the sorting portion 1030, a charge start command transmitting portion 1031b that transmits charge start commands to the electric actuators 100b in the group having a next highest priority when receiving charge completion responses from all of the electric actuators 100b to which the charge start commands have been transmitted, the storing portion 1032, the setting portion 1033, and a charge completion response receiving portion 1034 that receives a charge completion response from the electric actuator 100b.

Figure 19:
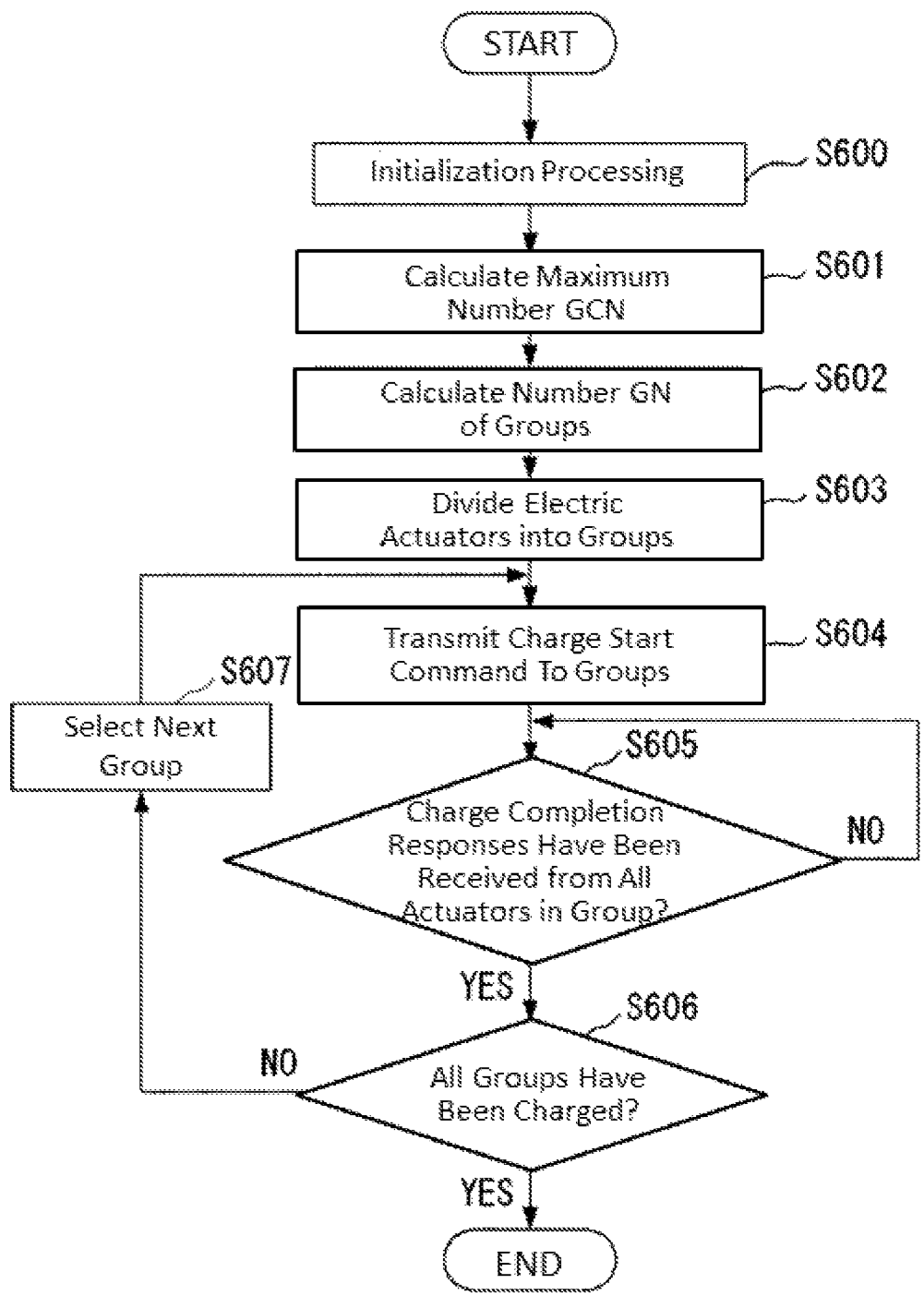
FIG. 19 is a flowchart illustrating the operation of the host device according to the third embodiment of the invention.

The operation of the charge controlling system according to the embodiment will be described below. FIG. 19 is a flowchart illustrating the operation of the host device 103b and FIG. 20 is a flowchart illustrating the operation of the electric actuator 100b.

Since the operation of the host device 103b in steps S600 to S603 in FIG. 19 is the same as the operation described in steps S100 to S103 in FIG. 5, description will be omitted.

After the sorting portion 1030 finishes sorting, the charge start command transmitting portion 1031b of the host device 103b transmits charge start commands to the electric actuators 100b belonging to group #1 having the first order (highest priority) of charging (step S604 in FIG. 19) and waits until charge completion responses have been received from all the electric actuators 100b belonging to group #1 (step S605 in FIG. 19).

Figure 20:
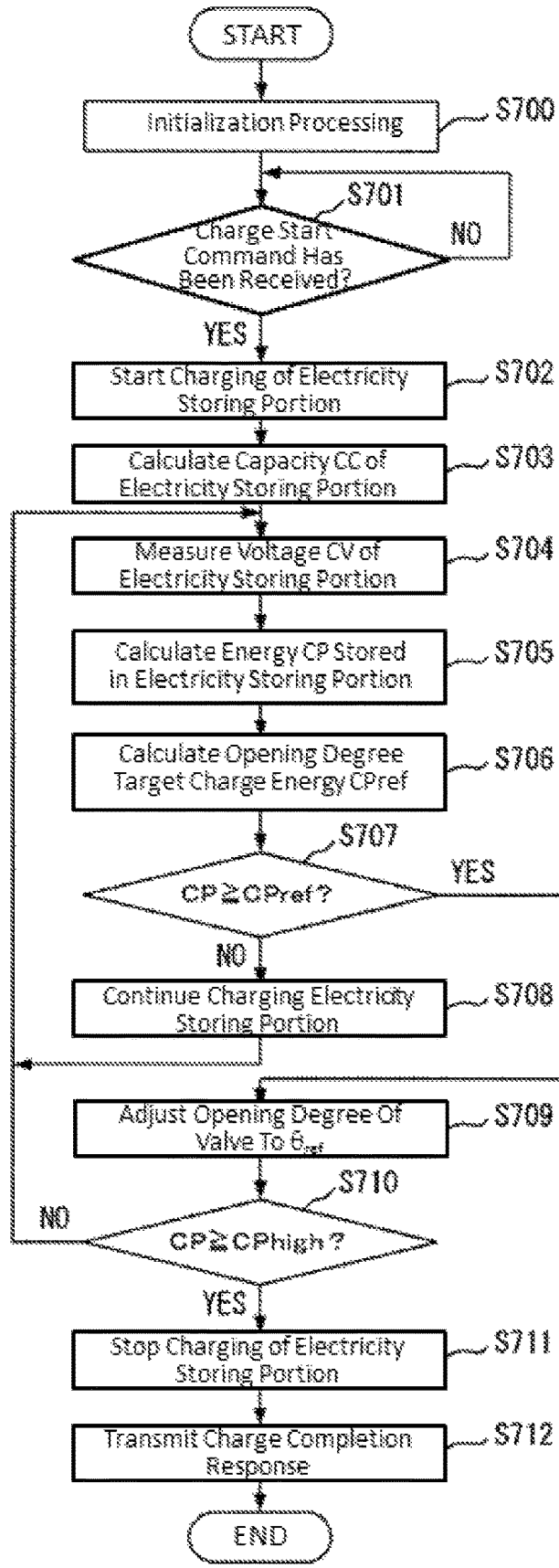
FIG. 20 is a flowchart illustrating the operation of the electric actuator according to the third embodiment of the invention.

Since the operation of the electric actuator 100b in steps S700 to S711 in FIG. 20 is the same as the operation described in steps S200 to S211 in FIG. 6, description will be omitted.

When the outputting of the charge enable signal stops and the electricity storing portion 2 has been charged, the charge completion response transmitting portion 88 of the controlling portion 8b transmits the charge completion response to the host device 103b that transmitted the charge start command (step S712 in FIG. 20).

Since the operation of the electric actuator 100*b* in normal times and in interruption of electric service is the same as the operations described in FIG. 12 and FIG. 13, description will be omitted.

As described above, after transmitting the charge start commands, the charge start command transmitting portion 1031*b* of the host device 103*b* waits until the charge completion responses have been received from all of the electric actuators 100*b* to which the charge start commands have been transmitted (step S605 in FIG. 19).

When the charge completion response receiving portion 1034 of the host device 103*b* has received the charge completion responses from all of the electric actuators 100*b* to which the charge start commands have been transmitted (YES in step S605), the charge start command transmitting portion 1031*b* decides whether the electricity storing portions 2 of the electric actuators 100*b* have been charged for all groups #1 to #GN (step S606 in FIG. 19).

Since group #2 having the second order of charging has not been charged here, the charge start command transmitting portion 1031*b* selects the next group #2 as the transmission destination of the charge start commands (step S607 in FIG. 19), returns to step S604, and transmits the charge start commands to the electric actuators 100*b* belonging to group #2 having the second order of charging.

In this way, the processing from step S604 to step S607 is repeatedly executed until the electricity storing portions 2 of the electric actuators 100*b* have been charged for all groups #1 to #GN by transmitting the charge start commands to groups #1 to #GN in sequence. The host device 103*b* ends the processing when all groups #1 to #GN have been charged.

As described above, in the embodiment, the host device 103*b* divides the plurality of electric actuators 100*b* connected to one power supply system 101 into groups and transmits the charge start commands for each of the groups as in the first and second embodiments. In the first and second embodiments, when the standard charge time CT elapses after transmitting the charge start commands, the charge start commands are transmitted to the electric actuators in the next group. The standard charge time CT is set to a slightly longer value to provide margin. However, since the capacitance of an electric double layer capacitor comprised in the electricity storing portion 2 is reduced over time, the actual charge time is apt to reduce gradually.

Accordingly, in the embodiment, the electric actuator 100*b* itself decides whether the electricity storing portion 2 has been charged and, when deciding that the electricity storing portion 2 has been charged, the electric actuator 100*b* transmits a charge completion response to the host device 103*b*. When receiving the charge completion responses from all of the electric actuators 100*b* to which the charge start commands have been transmitted, the host device 103*b* transmits the charge start commands to the electric actuators in the next group. Since the host device 103*b* does not wait for a certain time in the embodiment, the total charge time of the electric actuators 100*b* can become shorter than in the first embodiment.

Fourth Embodiment

Figure 21:
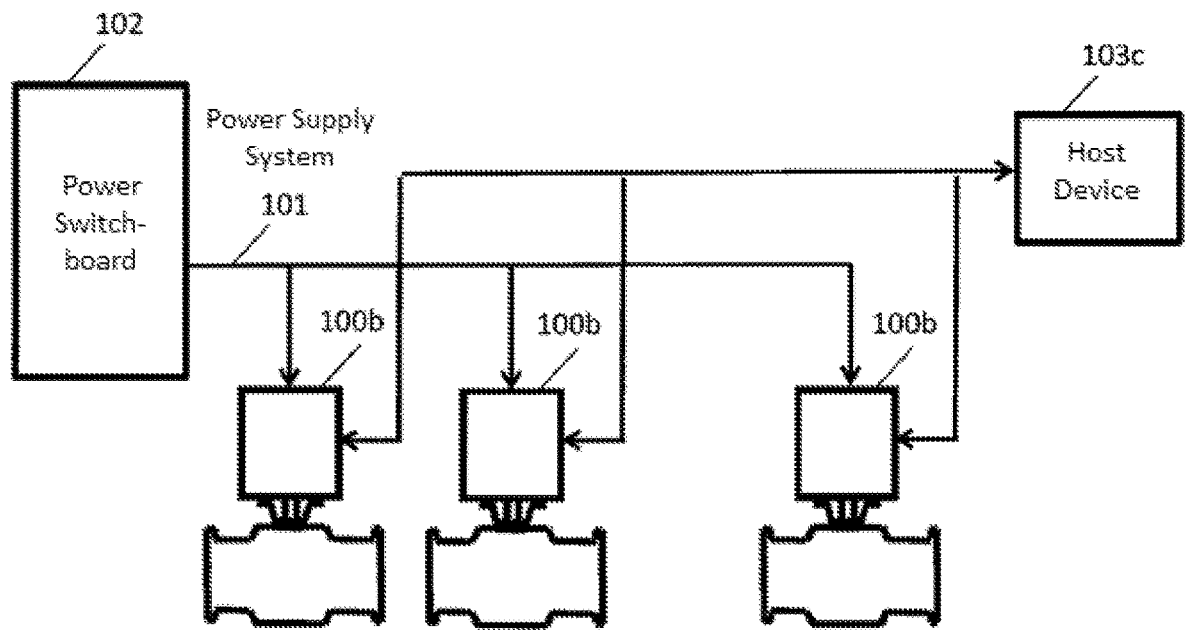
FIG. 21 is a block diagram illustrating the structure of a charge controlling system according to a fourth embodiment of the invention.

Next, the fourth embodiment of the invention will be described. FIG. 21 is a block diagram illustrating the structure of the charge controlling system according to the fourth embodiment of the invention. The charge controlling system according to the embodiment comprises the plurality of the electric actuators 100*b* and a host device 103*c* that controls the charging of the electric actuators 100*b*. The structure of the electric actuator 100*b* is the same as in the third embodiment.

Figure 22:
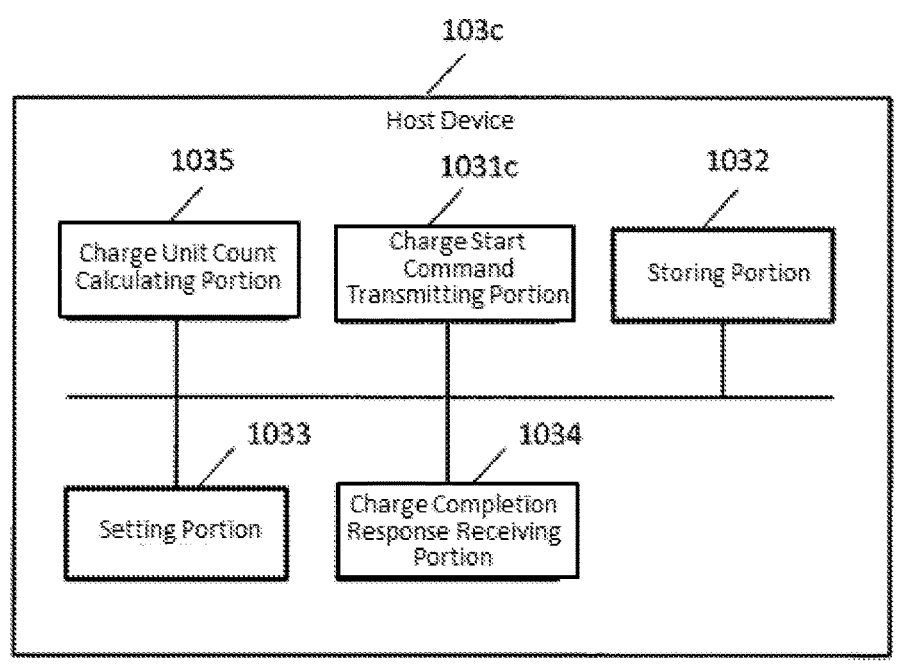
FIG. 22 is a block diagram illustrating the structure of a host device according to the fourth embodiment of the invention.

FIG. 22 is a block diagram illustrating the structure of the host device 103*c* according to the embodiment and the same components as in FIG. 4 and FIG. 18 are given the same reference numerals. The host device 103*c* comprises a charge start command transmitting portion 1031*c*, the storing portion 1032, the setting portion 1033, the charge completion response receiving portion 1034, and a charge unit count calculating portion 1035 that calculates the maximum number of the electric actuators 100*b* that can be charged at a time based on the maximum allowable current capacity value or the maximum allowable charge time.

Figure 23:
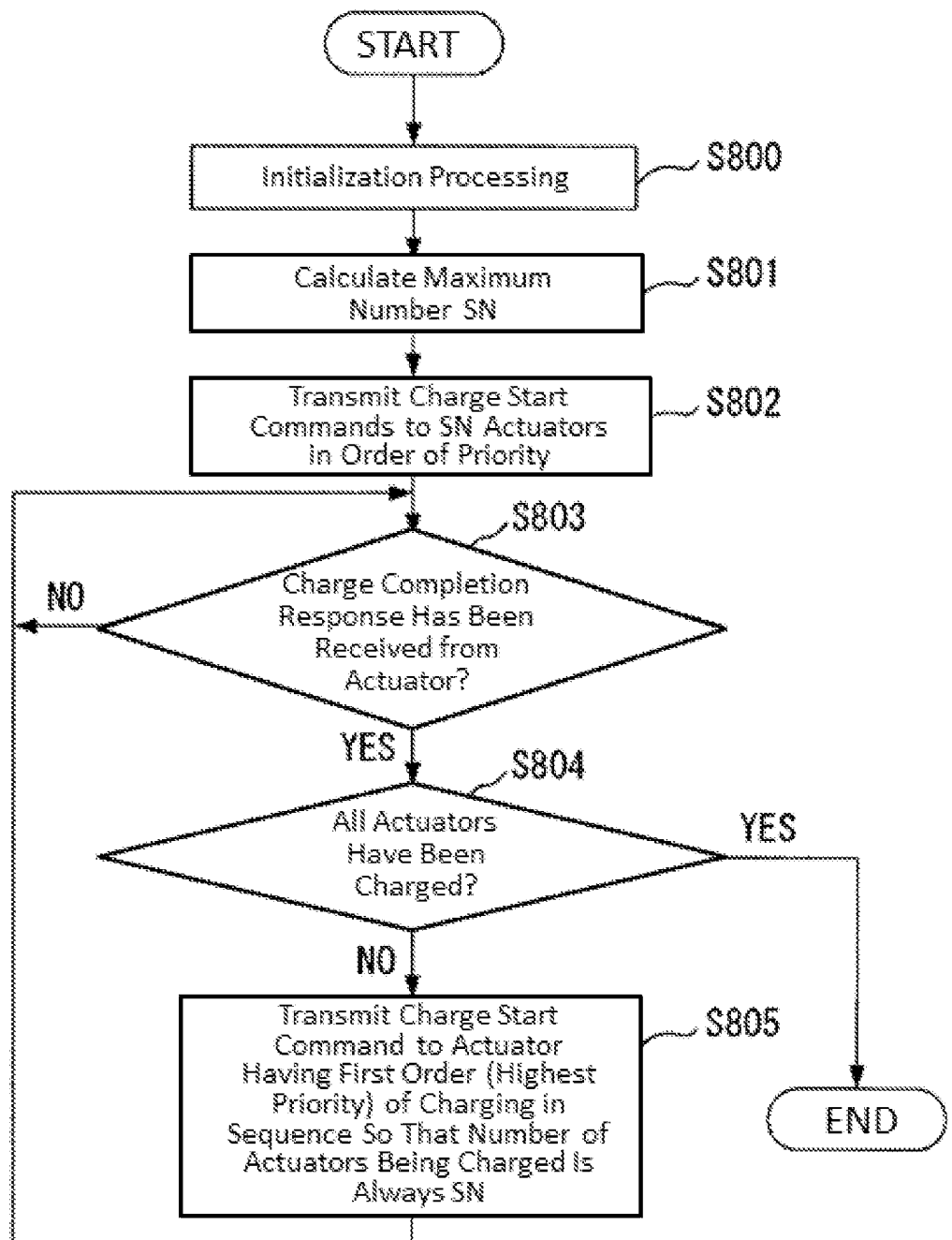
FIG. 23 is a flowchart illustrating the operation of the host device according to the fourth embodiment of the invention.
Figure 24:
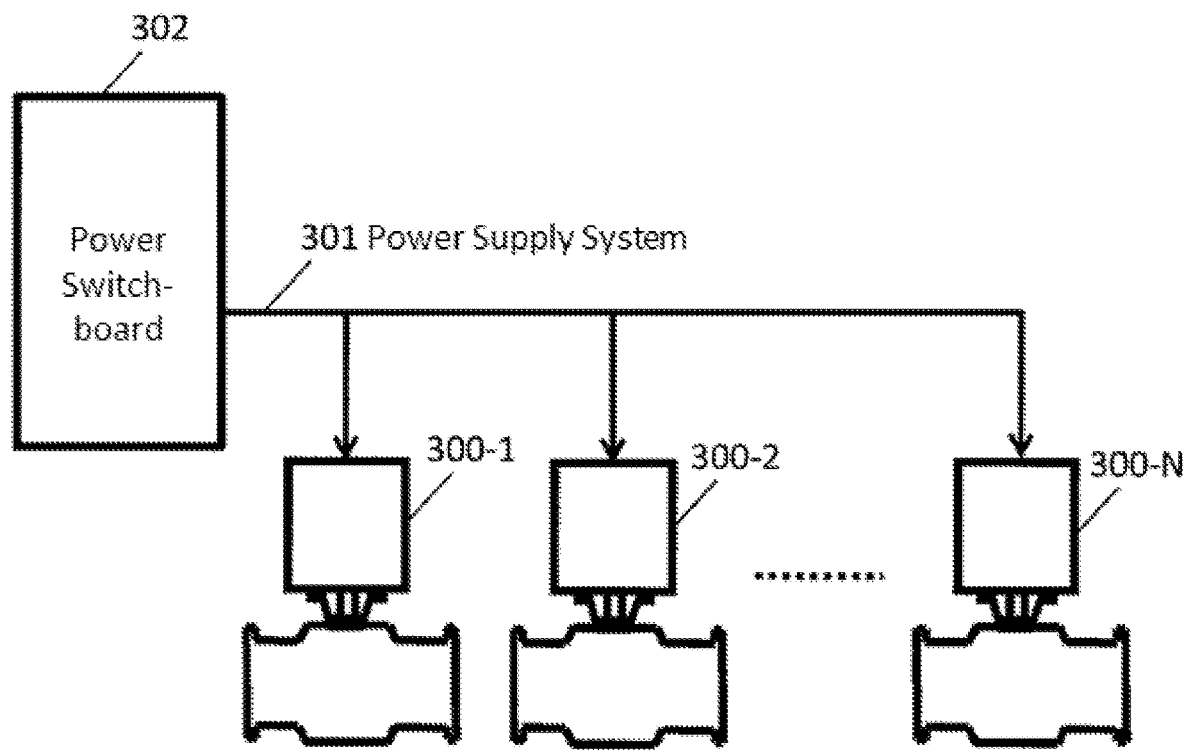
FIG. 24 illustrates the structure of a system in which a plurality of electric actuators are connected to one power supply system.
Figure 25:
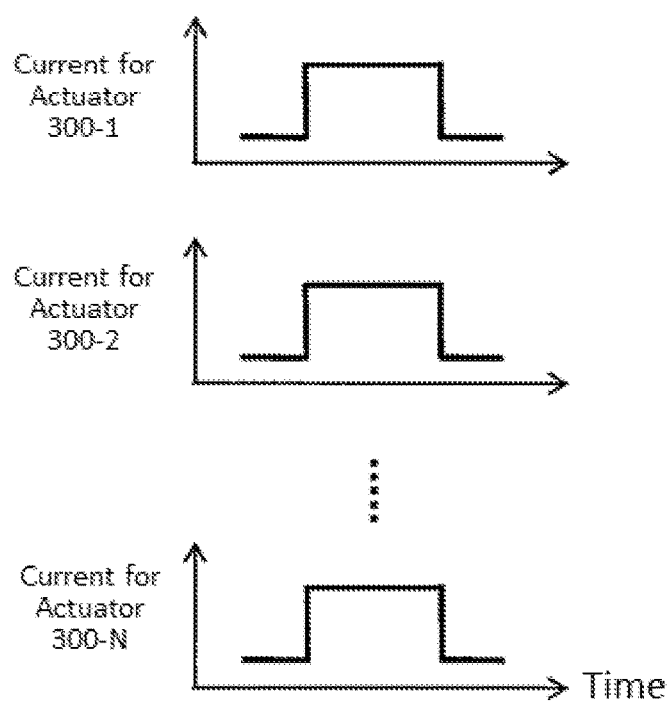
FIG. 25 shows a series of graphs used to describe how charge current flows through the power supply system all together when electricity storing portions of the plurality of electric actuators are charged at the same time.
Figure 26:
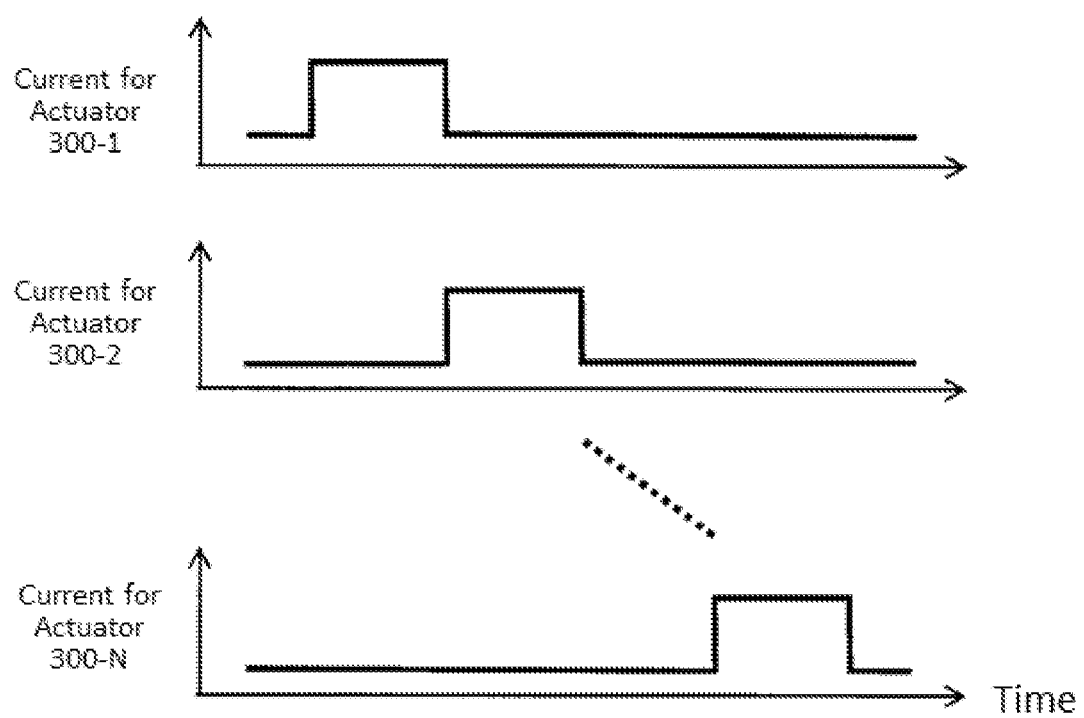
FIG. 26 shows a series of graphs used to describe how charge current flows through the power supply system in sequence when the electricity storing portions of the plurality of electric actuators are charged in sequence.

The operation of the charge controlling system according to the embodiment will be described below. FIG. 23 is a flowchart illustrating the operation of the host device 103*c*.

Since the operation of the host device 103*c* in step S800 in FIG. 23 is the same as the operation described in step S100 in FIG. 5, description will be omitted.

Next, the charge unit count calculating portion 1035 of the host device 103*c* calculates the maximum number SN of the electric actuators 100*b* that can be charged at a time (step S801 in FIG. 23). Since this maximum number SN can be obtained using the same method as for the maximum number GCN in the first to third embodiments, GCN obtained by expression (1) or expression (2) can be the maximum number SN.

After calculation of the maximum number SN, the charge start command transmitting portion 1031*c* of the host device 103*c* transmits the charge start commands to the SN electric actuators 100*b* according to the order (priority) of charging (step S802 in FIG. 23) and waits until the charge completion responses have been received from the electric actuators 100*b* to which the charge start commands have been transmitted (step S803 in FIG. 23).

The operation of the electric actuator 100*b* is the same as in the third embodiment. When the charge completion response receiving portion 1034 of the host device 103*c* receives the charge completion response from at least one of the electric actuators 100*b* to which the charge start commands have been transmitted (YES in step S803), the charge start command transmitting portion 1031*c* of the host device 103*c* decides whether the electricity storing portions 2 of all of the electric actuators 100*b* have been charged (step S804 in FIG. 23).

When there are the electric actuators 100*b* having the electricity storing portions 2 (to which the charge start commands have not transmitted) that have not been charged, the charge start command transmitting portion 1031*c* transmits the charge start command to the electric actuator 100*b* having the first order (highest priority) of charging so that the number of the electric actuators 100*b* being charged always equals the number SN (step S805 in FIG. 23) and the charge start command transmitting portion 1031*c* waits until the charge completion responses are received from the electric actuators 100*b* being charged (step S803).

In this way, the processing from step S803 to step S805 is repeatedly executed until the electricity storing portions 2 of all of the electric actuators 100*b* have been charged and, when all of the electric actuators 100*b* have been charged, the host device 103*c* stops the processing.

As described above, since the charge start commands are transmitted to the electric actuators 100*b* individually while controlling the number of electric actuators 100*b* to be charged at a time to the maximum number SN or less in the embodiment, the current capacity required for the power supply system 101 and the power switchboard 102 and the total charge time for the electric actuators 100b can be optimized. In addition, since the charge start commands are transmitted according to the priority of charging of the electric actuators 100b in the embodiment, the electricity storing portions 2 of the electric actuators 100b can be charged according to the priority.

In addition, since the charge start command is transmitted to the next electric actuator 100b when the charge completion response is received from at least one electric actuator 100b in the embodiment, the total charge time of the electric actuators 100b can become shorter than in the third embodiment.

It should be noted here that the structure of the electric actuator 100b in the third and fourth embodiments is similar to that in the first embodiment, but the structure of the electric actuator 100b may be similar to that in the second embodiment. In this case, it is enough to use the controlling portion 8b instead of the controlling portion 8 in FIG. 14.

In the first to fourth embodiments, the capacity calculating portion 85 and the charge energy calculating portion 86 are provided in the controlling portion 8 or 8b of the electric actuator 100, 100a, or 100b and, when the energy CP (in joules, J) stored in the electricity storing portion 2 is decided to be equal to or more than the charge energy upper limit value CPhigh (in joules, J), the charge controlling portion 80 (or 80b) stops the charging portion 3 (or 3a). However, the charge controlling portion 80 (or 80b) may stop the charging portion 3 (or 3a) when the standard charge time CT elapses after the starting of charging, so the invention is not limited to the first to fourth embodiments.

In addition, although an electric double layer capacitor is used as an electricity storing element in the electricity storing portion 2 in the first to fourth embodiments, the electricity storing element is not limited to an electric double layer capacitor and, for example, an element capable of storing electricity, such as a lithium-ion capacitor, is applicable.

In addition, although the constant current charging method and the method that uses an RC series circuit are described as methods used by the charging portion 3 to charge the electricity storing portion 2 in the first to fourth embodiments, another charging method may be used as long as CI and CT can be calculated.

In addition, although the opening degree target value is processed by the opening degree target processing portion 7 in the first to fourth embodiments, the opening degree target value may be obtained by processing the opening target command transmitted from the host device 103, 103b, or 103c using the communicating portion 14.

The host device 103, 103b, or 103c and the controlling portion 8 or 8b according to the first to fourth embodiments can be achieved by a computer comprising a CPU (Central Processing Unit), a memory device, and an interface communicating with the outside and programs that control such hardware resources. The CPUs of the devices execute the processing described in the first to fourth embodiments by following programs stored in the memory device.

INDUSTRIAL APPLICABILITY

The invention is applicable to techniques for charging electricity storing portions of electric actuators.

DESCRIPTION OF REFERENCE NUMERALS AND SIGNS 1, 1a: main power supply portion
2: electricity storing portion
3, 3a: charging portion
4: voltage boosting portion
5, 5a: electric service interruption detecting portion
6: main power supply switching portion
7: opening degree target processing portion
8, 8b: controlling portion
9: control power supply portion
10: motor
11: motor driving portion
12: reducer
13: position sensor
14: communicating portion
15: driving portion
16: rectifying portion
17: smoothing portion
80, 80b: charge controlling portion
81: opening degree controlling portion
82: voltage boosting controlling portion
83: return controlling portion
84: storing portion
85: capacity calculating portion
86: charge energy calculating portion
87: required energy calculating portion
88: charge completion response transmitting portion
100, 100a, 100b: electric actuator
200: valve
101: power supply system
102: power switchboard
103, 103b, 103c: host device
1030: sorting portion
1031, 1031b, 1031c: charge start command transmitting portion
1032: storing portion
1033: setting portion
1034: charge completion response receiving portion
1035: charge unit count calculating portion

The invention claimed is:

1. A charge controlling system, comprising:
a plurality of electric actuators that are connected to a single power supply system; and
a host device that controls charging of the plurality of electric actuators,
wherein each of the actuators comprises
an opening degree controlling portion that controls an opening degree of a valve according to an opening degree target value when the actuator is energized by receiving electric power from the power supply system,
an electricity storing portion that stores electric energy,
a charging portion that charges the electricity storing portion when the actuator is energized,
a return controlling portion that operates the valve to a predetermined opening position using the electric energy stored in the electricity storing portion when interruption of electric service occurs and the electric power from the power supply system is interrupted, and
a charge controlling portion that causes the charging portion to start charging of the electricity storing portion when receiving a charge start command from the host device, and
a charge completion response transmitting portion that transmits a charge completion response to the host device when the electricity storing portion has been charged,
wherein the host device comprises
a sorting portion that divides the plurality of electric actuators into groups according to a priority of charging, a charge start command transmitting portion that transmits the charge start command to the electric actuators for each of the groups in an order of the priority of charging, and a charge completion response receiving portion that receives the charge completion response from the electric actuators, and wherein the charge start command transmitting portion of the host device transmits the charge start command to the electric actuators in one of the groups that has a second highest priority after receiving the charge completion response from all of the electric actuators to which the charge start command has been transmitted.

2. The charge controlling system according to claim 1, wherein the sorting portion divides the plurality of electric actuators into the groups so that a total current flowing from the power supply system to the electric actuators being charged is equal to or less than a maximum allowable current capacity value and the electric actuators having a higher priority are charged earlier.

3. The charge controlling system according to claim 1, wherein the sorting portion divides the plurality of electric actuators into the groups so that a total time required to charge the plurality of electric actuators is equal to or less than a maximum allowable charge time and the electric actuators having a higher priority are charged earlier.

4. A charge controlling system, comprising:
a plurality of electric actuators that are connected to a single power supply system; and
a host device that controls charging of the plurality of electric actuators,
wherein each of the actuators comprises
an opening degree controlling portion that controls an opening degree of a valve according to an opening degree target value when the actuator is energized by receiving electric power from the power supply system,
an electricity storing portion that stores electric energy,
a charging portion that charges the electricity storing portion when the actuator is energized,
a return controlling portion that operates the valve to a predetermined opening position using the electric energy stored in the electricity storing portion when interruption of electric service occurs and the electric power from the power supply system is interrupted, and
a charge controlling portion that causes the charging portion to start charging of the electricity storing portion when receiving a charge start command from the host device,
wherein the host device comprises
a sorting portion that divides the plurality of electric actuators into groups according to a priority of charging, and
a charge start command transmitting portion that transmits the charge start command to the electric actuators for each of the groups in an order of the priority of charging, and
wherein
the sorting portion divides the plurality of electric actuators into the groups so that a total current flowing from the power supply system to the electric actuators being charged is equal to or less than a maximum allowable current capacity value and the electric actuators having a higher priority are charged earlier.

5. A charge controlling system, comprising:
a plurality of electric actuators that are connected to a single power supply system; and
a host device that controls charging of the plurality of electric actuators,
wherein each of the actuators comprises
an opening degree controlling portion that controls an opening degree of a valve according to an opening degree target value when the actuator is energized by receiving electric power from the power supply system,
an electricity storing portion that stores electric energy,
a charging portion that charges the electricity storing portion when the actuator is energized,
a return controlling portion that operates the valve to a predetermined opening position using the electric energy stored in the electricity storing portion when interruption of electric service occurs and the electric power from the power supply system is interrupted, and
a charge controlling portion that causes the charging portion to start charging of the electricity storing portion when receiving a charge start command from the host device,
wherein the host device comprises
a sorting portion that divides the plurality of electric actuators into groups according to a priority of charging, and
a charge start command transmitting portion that transmits the charge start command to the electric actuators for each of the groups in an order of the priority of charging, and
wherein
the sorting portion divides the plurality of electric actuators into the groups so that a total time required to charge the plurality of electric actuators is equal to or less than a maximum allowable charge time and the electric actuators having a higher priority are charged earlier.

6. A charge controlling system comprising:
a plurality of electric actuators that are connected to a single power supply system; and
a host device that controls charging of the plurality of electric actuators,
wherein each of the actuators comprises
an opening degree controlling portion that controls an opening degree of a valve according to an opening degree target value when the actuator is energized by receiving electric power from the power supply system,
an electricity storing portion that stores electric energy,
a charging portion that charges the electricity storing portion when the actuator is energized,
a return controlling portion that operates the valve to a predetermined opening position using the electric energy stored in the electricity storing portion when the electric power is shut off and interruption of electric service occurs and the electric power from the power supply system is interrupted,
a charge controlling portion that causes the charging portion to start charging of the electricity storing portion when receiving a charge start command from the host device, and
a charge completion response transmitting portion that transmits a charge completion response to the host device when the electricity storing portion has been charged, and wherein the host device comprises
a charge unit count calculating portion that calculates a maximum number of the electric actuators to be charged at a time based on a maximum allowable current capacity value or a maximum allowable charge time, and a charge start command transmitting portion that transmits the charge start command to the maximum number of the electric actuators in an order of a priority of charging, the charge start command transmitting portion transmitting the charge start command to an additional number of the electric actuators, based on a number of the electric actuators from which the charge completion response is received, in the order of the priority of charging among the electric actuators that have not been charged when receiving the charge completion response.

7. The charge controlling system according to claim 6, wherein the charge unit count calculating portion calculates the maximum number so that a total current flowing from the power supply system to the electric actuators being charged is equal to or less than the maximum allowable current capacity value.

8. The charge controlling system according to claim 6, wherein the charge unit count calculating portion calculates the maximum number so that a total time required to charge the plurality of electric actuators is equal to or less than the maximum allowable charge time.

9. The charge controlling system according to claim 4, wherein the charge start command transmitting portion of the host device transmits the charge start command to the electric actuators in one of the groups with a second highest priority when a predetermined charge time elapses after transmitting the charge start command to the electric actuators in another group with a first highest priority.

10. The charge controlling system according to claim 5, wherein the charge start command transmitting portion of the host device transmits the charge start command to the electric actuators in one of the groups with a second highest priority when a predetermined charge time elapses after transmitting the charge start command to the electric actuators in another group with a first highest priority.

* * * * *